US006957212B2

(12) United States Patent
Peng

(10) Patent No.: US 6,957,212 B2
(45) Date of Patent: Oct. 18, 2005

(54) APPARATUS AND METHODS FOR INTELLIGENTLY CACHING APPLICATIONS AND DATA ON A GATEWAY

(75) Inventor: Luosheng Peng, San Jose, CA (US)

(73) Assignee: InnoPath Software, Inc., Alviso, CA (US)

( * ) Notice: Subject to any disclaimer, the term of this patent is extended or adjusted under 35 U.S.C. 154(b) by 346 days.

(21) Appl. No.: 09/841,777

(22) Filed: Apr. 24, 2001

(65) Prior Publication Data

US 2002/0178178 A1 Nov. 28, 2002

(51) Int. Cl.[7] .............................................. G06F 17/30
(52) U.S. Cl. ............................... 707/3; 707/10; 707/4
(58) Field of Search ........................ 707/2, 3, 10, 200, 707/4

(56) References Cited

U.S. PATENT DOCUMENTS

| | | | | |
|---|---|---|---|---|
| 5,568,181 | A | * | 10/1996 | Greenwood et al. .......... 725/92 |
| 5,790,828 | A | * | 8/1998 | Jost ................................ 711/4 |
| 5,924,088 | A | * | 7/1999 | Jakobsson et al. ............. 707/2 |
| 6,266,658 | B1 | * | 7/2001 | Adya et al. ..................... 707/2 |
| 6,279,041 | B1 | * | 8/2001 | Baber et al. ................. 709/232 |
| 6,421,713 | B1 | * | 7/2002 | Lamparter .................. 709/216 |
| 6,453,334 | B1 | * | 9/2002 | Vinson et al. .............. 709/203 |
| 6,535,911 | B1 | * | 3/2003 | Miller et al. ................ 707/202 |
| 6,651,141 | B2 | * | 11/2003 | Adrangi ...................... 709/226 |

FOREIGN PATENT DOCUMENTS

JP    2000-029765    *    1/2000 ........... G96F/12/00

OTHER PUBLICATIONS

Serpanos et al. Effective caching of Web Objects using Jipf's law, date: Jul. 30 to Aug. 2, 2000, pp. 727–730, Vo. 2.*
Michael et al. A caching file system for a programmer's workstation, (ACM Symposium on Operating System principles, 1985, pp. 25–34.*
U.S. Appl. No. 09/836,972, filed Apr. 16, 2001; "Apparatus and Methods For Managing Caches on a Mobile Device"; Inventor: Luosheng Peng.
U.S. Appl. No. 09/840,736, filed Apr. 23, 2001; "Apparatus and Method For Intelligently Caching Applications and Data on a Mobile Device"; Inventor Luosheng Peng.
U.S. Appl. No. 09/840,739, filed Apr. 23, 2001; "Apparatus and Method For Managing Caches on a Gateway"; Inventor: Luosheng Peng.

* cited by examiner

Primary Examiner—Jean M. Corrielus
Assistant Examiner—Baoquoc N. To
(74) Attorney, Agent, or Firm—Patent Esque Law Group, LLP; Roxana H. Yang

(57) ABSTRACT

An exemplary method for intelligently caching applications and data on a gateway comprises the steps of calculating a cache benefit index for a set of files, the cache benefit index measuring a total benefit for caching the set of files, determining whether to cache the set of files on a local file system based on the cache benefit index, caching the set of files on the local file system, and updating a set of tables in a gateway database based on the caching.

34 Claims, 28 Drawing Sheets

Application Identification Table

| Column | Data Type | Length | Description |
| --- | --- | --- | --- |
| appURL | String of unicode characters | Variable length | Application URL, comprising protocol name, host address, path, and application name. Example: http://www.mysite.com/asp/myapp. |
| appID | Unsigned integer | 4 bytes | Unique identifier for the corresponding application URL. |

FIG. 4

Data Identification Table

| Column | Data Type | Length | Description |
| --- | --- | --- | --- |
| dataURL | String of unicode characters | Variable length | Data URL, comprising protocol name, host address, path, and data file name or a database query. Example: http://www.mysite.com/data/mydata. |
| dataID | Unsigned integer | 4 bytes | Unique identifier for the corresponding data URL. |

FIG. 5

Subscriber Registration Table

| Column | Data Type | Length | Description |
| --- | --- | --- | --- |
| subID | String of unicode characters | Variable length | Subscriber identifier. |
| subName | String of unicode characters integer | Variable length | Subscriber name. |
| password | String | Variable length | User password. |
| birthDate | Date | 7 bytes | User birth date |
| flagSet | unsigned integer | 1 byte | Flag:<br>• The 1$^{st}$ bit to 7$^{th}$ bit are reserved;<br>• If the 8$^{th}$ bit is on, the subscriber is disabled for the service. |

FIG. 6

Application Registration Table

| Column | Data Type | Length | Description |
|---|---|---|---|
| appID | Unsigned integer | 4 bytes | App URL, comprising protocol name, host address, path, and app name. Example: http://www.mysite.com/asp/app/myapp. |
| appVer | Byte array | 16 bytes | Application version. It will be automatically filled in by the gateway. |
| flagSet | Unsigned integer | 1 byte | Flag:<br>• If the $1^{st}$ bit is on, the corresponding application is permitted for caching;<br>• The $2^{nd}$ bit to $7^{th}$ bit are reserved;<br>• If the $8^{th}$ bit is on, the corresponding application is disabled from user access. |
| domName | String | Variable length | The domain name of the corresponding application URL. |
| procolType | String | Variable length | The protocol type of the corresponding application URL. |
| virtualPath | String | Variable length | The virtual path of the corresponding application URL. |
| portNo | Unsigned integer | 2 bytes | The port number of the corresponding application URL. 0 indicates using the standard port number for the corresponding protocol type. |

FIG. 7

Compression Methods Table

| Column | Data Type | Length | Description |
|---|---|---|---|
| compName | String | Variable length | Data compression method name. |
| compID | Unsigned integer | 1 byte | Unique identifier for the corresponding data compression method ID. |

FIG. 8

Compatible (3i) Server Registration Table

| Column | Data Type | Length | Description |
|---|---|---|---|
| domName | String | Variable length | Compatible server domain name. |
| owner | String | Variable length | Owner of the corresponding compatible server. |
| patchVer | Byte array | 3 bytes | The server patch version installed on the corresponding compatible server. It is encoded as follows:<br>• The $1^{st}$ byte indicates the major version;<br>• The $2^{nd}$ byte indicates the minor version;<br>• The $3^{rd}$ byte indicates the revision number. |

FIG. 9

Session Management Table

| Column | Data Type | Length | Description |
|---|---|---|---|
| sessionID | Unsigned integer | 4 bytes | Session identifier. |
| subID | String | Variable length | The identifier of the subscriber who caused to create the corresponding session. |
| procolVer | Byte array | 3 bytes | The protocol version used in the corresponding session. It is encoded as follows:<br>• The $1^{st}$ byte indicates the major version;<br>• The $2^{nd}$ byte indicates the minor version;<br>• The $3^{rd}$ byte indicates the revision number. |
| compID | Unsigned integer | 1 byte | The identifier of the data compression method used in the corresponding session. |
| optionProp | Binary stream | Variable length | Optional properties of the corresponding session. It is encode as follows:<br>• The $1^{st}$ byte is a flag to indicate which optional properties are defined;<br>• All the following bytes are the values of defined properties; |
| timeStamp | Unsigned integer | 4 bytes | The starting time stamp of the corresponding session. |
| TTL | Unsigned integer | 4 bytes | The designated session lifetime in second. |

FIG. 10

Application Download/Update Histories Table

| Column | Data Type | Length | Description |
|---|---|---|---|
| appID | Unsigned integer | 4 bytes | Application identifier. |
| appSize | Unsigned integer | 4 bytes | Size in byte of the corresponding application. |
| nDownload | Unsigned integer | 4 bytes | Number of downloads of the corresponding application by all local mobile devices. |
| nUpdate | Unsigned integer | 4 bytes | Number of updates on the corresponding application by all local mobile devices. |
| updateRate | Unsigned integer | 1 byte | Average update rate (1-100 in percentage) for the *nUpdate* updates on the corresponding application by all local mobile devices. |
| timeStamp | Unsigned integer | 4 bytes | The time stamp of the last download of or update on the corresponding application by a mobile devices, based on the corresponding gateway's local clock. |

FIG. 11

Data Download/Update Histories Table

| Column | Data Type | Length | Description |
|---|---|---|---|
| dataID | Unsigned integer | 4 bytes | Data identifier. |
| dataSize | Unsigned integer | 4 bytes | Size in byte of corresponding data. |
| nDownload | Unsigned integer | 4 bytes | Number of data downloads of the corresponding data by all local mobile devices. |
| nUpdate | Unsigned integer | 4 bytes | Number of updates on the corresponding data by all the local mobile devices. |
| updateRate | Unsigned integer | 1 byte | Average update rate (1-100 in percentage) for the *nUpdate* updates on the corresponding data by all the local mobile devices. |
| timeStamp | Unsigned integer | 4 bytes | The time stamp of the last download of or update on the corresponding data by a mobile device, based on the corresponding gateway's local clock. |

FIG. 12

Application Storage Table

| Column | Data Type | Length | Description |
|---|---|---|---|
| appID | Unsigned integer | 2 bytes | Application identifier associated with the corresponding application URL. |
| nFile | unsigned integer | 1 byte | Number of files included in the corresponding application. |
| fNames | Array of strings of unicode characters | Variable length | Array of the names of all files included in the corresponding application. |
| appVer | Byte array | 16 bytes | Application version. It will be filled in by the gateway. |
| fVers | Array of byte array | Variable length | Array of the version information of all files included in the corresponding application. |
| root | String of unicode characters | Variable length | Root directory in the local storage where the corresponding application is cached. |
| nextRel | Unsigned interger | 4 bytes | Next release time of the corresponding application, based on the corresponding origin application server's local clock. |
| lang | Unsigned integer | 1 byte | Code, indicating the type of computer language used to write the corresponding application. |
| flagSet | Unsigned integer | 1 byte | Flag:<br>• The $1^{st}$ bit to $7^{th}$ bit are reserved;<br>• If the $8^{th}$ bit is on, the corresponding application is out-of-date. |
| nUpdate | Unsigned integer | 2 byte | Number of updates on the corresponding application by the corresponding gateway since the application has been cached. |
| updateRate | Unsigned integer | 1 byte | Average update rate (1-100 in percentage) for the *nUpdate* updates on the corresponding application by the corresponding gateway. |
| CBI | Unsigned integer | 4 bytes | Cache Benefit Index. |
| updateItvl | Unsigned integer | 4 bytes | The guessed application update interval. |

FIG. 13

Data Storage Table

| Column | Data Type | Length | Description |
|---|---|---|---|
| dataID | Unsigned integer | 2 bytes | Data Identifier of the corresponding data URL. |
| root | String of unicode characters | Variable length | Root directory in the local storage where the corresponding data is stored. |
| flagSet | Unsigned integer | 1 byte | Flag:<br>• If the $1^{st}$ bit is on, the corresponding application is updated by at least one 3i mobile terminal.<br>• The $2^{nd}$ bit to $7^{th}$ bit are reserved;<br>• If the $8^{th}$ bit is on, the corresponding application is out-of-date. |
| DataVer | Byte array | 16 bytes | Version information of the corresponding execution of data. |
| nUpdate | Unsigned integer | 2 byte | Number of updates on the corresponding data. |
| updateRt | Unsigned integer | 1 byte | Average update rate (1-100 in percentage) for the *nUpdate* updates on the corresponding data. |
| CBI | unsigned integer | 4 bytes | Cache Benefit Index. |
| updateItvl | Unsigned integer | 4 bytes | The guessed data update interval. |

FIG. 14

Mobile Application cache table

| Column | Data Type | Length | Description |
|---|---|---|---|
| subID | String | Variable length | Subscriber identifier. |
| appID | Unsigned integer | 4 bytes | The identifier of the application cached on the corresponding mobile device. |
| appVer | Byte array | 16 bytes | The latest version of the application cached on the corresponding mobile device. |

FIG. 15

Mobile Application Use Table

| Column | Data Type | Length | Description |
|---|---|---|---|
| subID | String | Variable length | Subscriber identifier. |
| appID | Unsigned integer | 4 bytes | The identifier of the application executed by the corresponding subscriber. |
| timeStamp | Unsigned integer | 4 bytes | The time stamp of the corresponding execution of the corresponding application by the corresponding subscriber. |
| peCBI | Unsigned integer | 4 bytes | Per-execution CBI, i.e., the number of bytes saved from wireless communications by caching the corresponding application on the corresponding mobile terminal. |

FIG. 16

Broadcast Table

| Column | Data Type | Length | Description |
|---|---|---|---|
| subID | String | Variable length | Subscriber identifier |
| appID | Unsigned integer | 4 bytes | The identifier of the application on which the corresponding broadcast message was received by the corresponding gateway. |
| appVer | Byte array | 16 bytes | The version information of the broadcast application. |

FIG. 17

Configuration Table

| Column | Data Type | Length | Description |
|---|---|---|---|
| Name | String of Unicode characters | Variable length | Parameter name.<br>MAX_APP_CACHE_SIZE: The maximum memory size in byte for the intelligent application caching.<br>MAX_DAT_CACHE_SIZE: The maximum memory size in byte for the intelligent data caching.<br>FREE_APP_MEM_SIZE: The memory size in byte that is free for application caching. It is MAX_APP_CACHE_SIZE initially.<br>FREE_DATA_MEM_SIZE: The memory size in byte that is free for data caching. It is MAX_DATA_CACHE_SIZE initially<br>EFFECT_PERIOD: The amount of time application and data records can be stored in the gateway DB since the last execution of or access on the corresponding applications or data.<br>MAX_DB_CONNECTS: The maximum number of DB connections.<br>MAX_COMM_CONNECTS: The maximum number of wireless communications connections.<br>UPDATE_TM_PERCENT: The percentage of the actual application or data update interval against the guessed update interval of the corresponding application or data.<br>UPDATE_TM_WEIGHT: The weight of the last actual application or data update interval against the previous guessed update interval of the corresponding application or data.<br>SCHE_RETRY_TM: The retry interval after an application update schedule expires and before its update is actually confirmed.<br>USER_EVENT_PRIO: The priority of a gateway-to-server request driven by a user event.<br>BRD_SCHE_PRIO: The priority of a gateway-to-server request caused by application update schedule expiration or a server-to-gateway broadcast message.<br>GUESSED_UPDATE_PRIO: The priority of a gateway-to-server request caused by estimated application or data update interval.<br>PASSWD_RETRY_NO: The permitted number of retries of for a password matching failure.<br>MAX_IGNORE_NO: The maximum continuous ignorance number on applications.<br>APP_CACHE_ROOT: The top-level directory where applications can be cached.<br>DATA_CACHE_ROOT: The top-level directory where data can be cached.<br>SESSION_TTL: The time-to-live of a newly created logical session, during which, the session may be reused.<br>LAST_SESSION_ID: The last assigned wireless communication session identifier. It will be 0 initially.<br>VERSION_TTL: The time-to-live of the difference files associated to the oldest version of an application cached in the gateway.<br>LAST_APP_ID: The last assigned application identifier. It will be 0 initially.<br>LAST_DATA_ID: The last assigned data identifier. It will be 0 initially.<br>LAST_APP_KEY_ID: The last assigned application-key pair identifier. It will be 0 initially.<br>DEFAULT_CHECK_TM: The initial (default) amount of time allowed between two application or data status check requests.<br>W_COMM_TIMEOUT: The timeout time for a wireless communication message.<br>I_COMM_TIMEOUT: The timeout time for an Internet communication message.<br>W_COMM_RETRY_NO: The permitted number of retries for a wireless communication failure.<br>I_COMM_RETRY_NO: The permitted number of retries for an Internet communication failure. |
| Value | String of unicode characters | Variable length | Parameter value. It needs to be reinterpreted for different parameter names. |

FIG. 18

| Request Type | Remarks |
|---|---|
| Open session | Open a logical session. |
| Reuse session | Reuse a previously created logical session. |
| Application Download | Download an application. |
| Application Update | Update an application that is cached on the requesting side. |
| Application Status Check | Check if there is any difference between the version of an application cached on the requesting side and the version of the application residing in its original server. |
| Application Status Check & Update | Check if there is any difference between the version of an application cached on the requesting side and the version of the application residing in its original server, and if there is a difference, update the application cached on the requesting side. |
| Close session | Close a logical session. |

FIG. 20

APPARATUS AND METHODS FOR INTELLIGENTLY CACHING APPLICATIONS AND DATA ON A GATEWAY

FIELD OF THE INVENTION

This invention relates to apparatus and methods for intelligently caching applications and data. In particular, this invention relates to apparatus and methods for intelligently caching applications and data on a gateway.

BACKGROUND OF THE INVENTION

Generally, wireless/mobile devices are connected to servers on the Internet through one or more gateways. Using a micro-browser application on a mobile device, a user may browse the Internet through the gateway(s).

Most wireless/mobile devices have inadequate processing capability for retrieving information, such as applications or data, and very limited memory space for caching such information. Thus, downloading applications or data from the Internet onto a mobile device may be very slow and sometimes unsuccessful. One possible solution to circumvent the need to repeatedly download the same applications and data from servers connected to the Internet is to cache them on the gateway(s). Gateways also have limited memory space and cannot cache all available applications and data; thus, an intelligent caching of the most likely to be called applications or data is necessary to optimize this solution.

Thus, it is desirable to provide apparatus and methods for intelligently caching applications and data on the gateway.

SUMMARY OF THE INVENTION

An exemplary method for intelligently caching applications and data on a gateway comprises the steps of calculating a cache benefit index for a set of files, the cache benefit index indicating a total benefit for caching the set of files, determining whether to cache the set of files on a local file system based on the cache benefit index, caching the set of files on the local file system, and updating a set of tables in a gateway database based on the caching.

In one embodiment, the determining step includes the steps of checking available free space in the local file system and allowing caching of the set of files into the local file system if the local file system has enough available free space for storing the set of files. In another embodiment, the determining step includes the steps of comparing the cache benefit index to a previously calculated cache benefit index for the set of files and allowing caching of the set of files if the cache benefit index is higher than the previously calculated cache benefit index. In yet another embodiment, the determining step includes the steps of comparing the cache benefit index to other cache benefit indices of files already cached on the local file system and allowing caching of the set of files if the cache benefit index is higher than the other cache benefit indices.

In an exemplary embodiment, the method further comprises the steps of recalculating a new cache benefit index for the set of files upon receiving a request to download or update the set of files and updating the set of tables in the gateway database based on the new cache benefit index.

When a download request for the set of files is received by the gateway, the exemplary method further comprises the steps of accessing the set of files in the local file system if the set of files is cached and up-to-date, creating a download response to the download request, the download response including the set of files, and sending the download response. In one embodiment, the set of files is updated from a server if it is cached but not up-to-date. In another embodiment, the set of files is downloaded from a server if it is not cached. In this embodiment, the set of files is downloaded by sending a request to the server, receiving a response from the server, the response including the set of files, parsing the response for any broadcast message, accessing and updating the gateway database if the response includes a broadcast message, and sending a broadcast response to the server.

When an update request for the set of files is received by the gateway, in one embodiment, the exemplary method further comprises the steps of accessing the local file system to obtain at least one difference file and a broadcast message if the set of files is cached and up-to-date, creating an update response to the update request, the update response including the at least one difference file and the broadcast message, and sending the update response. In another embodiment, the exemplary method further comprises the steps of downloading the set of files from a server if the set of files is not cached, creating an update response to the update request, the update response including the downloaded set of files, and sending the update response. In yet another embodiment, the exemplary method further comprises the steps of receiving at least one difference file from a server if the set of files is cached but is not up-to-date, creating an update response to the update request, the update response including the at least one difference file, and sending the update response. In yet another embodiment, the exemplary method further comprises the steps of downloading a current version of the set of files from a server if the set of files is cached but is not up-to-date, generating at least one difference file based on the current version, creating an update response to the update request, the update response including the at least one difference file, and sending the update response.

When a status check request for the set of files is received by the gateway, in one embodiment, the exemplary method further comprises the steps of accessing the local file system to load any broadcast information if the set of files is up-to-date, creating a status check response, the status check response including the broadcast information and a status of the set of files, and sending the status check response. In another embodiment, the exemplary method further comprises the steps of sending a request to a server if the set of files is cached and is not up-to-date, receiving a server response from the server, the server response including a current version and status of the set of files, updating the gateway database based on the current version and status, creating a status check response, the status check response including the status of the set of files, and sending the status check response. In an exemplary embodiment, at least one difference file is generated based on the current version, the set of files is updated based on the difference file(s), and the difference file(s) is sent in the status check response. In another exemplary embodiment, the server response is parsed for any broadcast message, the gateway database is accessed and updated if the server response includes a broadcast message, and a broadcast response is sent to the server. In yet another embodiment, the exemplary method further comprises the steps of downloading a current version of the set of files from a server, comparing the current version of the set of files to the set of files, generating the status based on the comparing, creating a status check response, the status check response including the status of the set of files, and sending the status check response.

An exemplary computer program product for use in conjunction with a computer system for intelligently caching applications and data on a gateway comprises logic code for calculating a cache benefit index for a set of files, the cache benefit index indicating a total benefit for caching the set of files, logic code for determining whether to cache the set of files on a local file system based on the cache benefit index, logic code for caching the set of files on the local file system, and logic code for updating a set of tables in a gateway database based on the caching.

In one embodiment, the logic code for determining includes logic code for checking available free space in the local file system and logic code for allowing caching of the set of files into the local file system if the local file system has enough available free space for storing the set of files. In another embodiment, the logic code for determining includes logic code for comparing the cache benefit index to a previously calculated cache benefit index for the set of files and logic code for allowing caching of the set of files if the cache benefit index is higher than the previously calculated cache benefit index. In yet another embodiment, the logic code for determining includes logic code for comparing the cache benefit index to other cache benefit indices of files already cached on the local file system and logic code for allowing caching of the set of files if the cache benefit index is higher than the other cache benefit indices.

In an exemplary embodiment, the computer program product further comprises logic code for recalculating a new cache benefit index for the set of files upon receiving a request to download or update the set of files and logic code for updating the set of tables in the gateway database based on the new cache benefit index.

When a download request for the set of files is received by the gateway, the exemplary computer program product further comprises logic code for accessing the set of files in the local file system if the set of files is cached and up-to-date, logic code for creating a download response to the download request, the download response including the set of files, and logic code for sending the download response. In one embodiment, the computer program product includes logic code for updating the set of files from a server if it is not up-to-date. In another embodiment, the computer program product includes logic code for downloading the set of files from a server if it is not cached. In this embodiment, the logic code for downloading includes logic code for sending a request to the server, logic code for receiving a response from the server, the response including the set of files, logic code for parsing the response for any broadcast message, logic code for accessing and updating the gateway database if the response includes a broadcast message, and logic code for sending a broadcast response to the server.

When an update request for the set of files is received by the gateway, in one embodiment, the exemplary computer program product further comprises logic code for accessing the local file system to obtain at least one difference file and a broadcast message if the set of files is cached and up-to-date, logic code for creating an update response to the update request, the update response including the at least one difference file and the broadcast message, and logic code for sending the update response. In another embodiment, the exemplary computer program product further comprises logic code for downloading the set of files from a server if the set of files is not cached, logic code for creating an update response to the update request, the update response including the downloaded set of files, and logic code for sending the update response. In yet another embodiment, the exemplary computer program product further comprises logic code for receiving at least one difference file from a server if the set of files is cached but is not up-to-date, logic code for creating an update response to the update request, the update response including the at least one difference file, and logic code for sending the update response. In yet another embodiment, the exemplary computer program product further comprises logic code for receiving an update request for the set of files, logic code for downloading a current version of the set of files from a server if the set of files is cached but is not up-to-date, logic code for generating at least one difference file based on the current version, logic code for creating an update response to the update request, the update response including the at least one difference file, and logic code for sending the update response.

When a status check request for the set of files is received by the gateway, in one embodiment, the exemplary computer program product further comprises logic code for accessing the local file system to load any broadcast information if the set of files is up-to-date, logic code for creating a status check response, the status check response including the broadcast information and a status of the set of files, and logic code for sending the status check response. In another embodiment, the exemplary computer program product further comprises logic code for sending a request to a server if the set of files is cached and is not up-to-date, logic code for receiving a server response from the server, the server response including a current version and status of the set of files, logic code for updating the gateway database based on the current version and status, logic code for creating a status check response, the status check response including the status of the set of files, and logic code for sending the status check response. In an exemplary embodiment, the computer program product further comprises logic code for generating at least one difference file based on the current version, logic code for updating the set of files based on the difference file, and logic code for sending the difference file in the status check response. In another exemplary embodiment, the computer program product further comprises logic code for parsing the server response for any broadcast message, logic code for accessing and updating the gateway database if the response includes a broadcast message, and logic code for sending a broadcast response to the server. When a status check request for the set of files is received by the gateway, in yet another embodiment, the exemplary computer program product further comprises logic code for downloading a current version of the set of files from a server, logic code for comparing the current version of the set of files to the set of files, logic code for generating the status based on the comparing, logic code for creating a status check response, the status check response including the status of the set of files, and logic code for sending the status check response.

BRIEF DESCRIPTION OF THE DRAWINGS

FIG. 4 illustrates an exemplary application identification table in accordance with an embodiment of the invention.

FIG. 5 illustrates an exemplary data identification table in accordance with an embodiment of the invention.

FIG. 6 illustrates an exemplary subscriber registration table in accordance with an embodiment of the invention.

FIG. 7 illustrates an exemplary application registration table in accordance with an embodiment of the invention.

FIG. 8 illustrates an exemplary compression methods table in accordance with an embodiment of the invention.

FIG. 9 illustrates an exemplary compatible (3i) server registration table in accordance with an embodiment of the invention.

FIG. 10 illustrates an exemplary session management table in accordance with an embodiment of the invention.

FIG. 11 illustrates an exemplary application download/update histories table in accordance with an embodiment of the invention.

FIG. 12 illustrates an exemplary data download/update histories table in accordance with an embodiment of the invention.

FIG. 13 illustrates an exemplary application storage table in accordance with an embodiment of the invention.

FIG. 14 illustrates an exemplary data storage table in accordance with an embodiment of the invention.

FIG. 15 illustrates an exemplary mobile application cache table in accordance with an embodiment of the invention.

FIG. 16 illustrates an exemplary mobile application use table in accordance with an embodiment of the invention.

FIG. 17 illustrates an exemplary broadcast table in accordance with an embodiment of the invention.

FIG. 18 illustrates an exemplary configuration table in accordance with an embodiment of the invention.

FIG. 20 illustrates an exemplary request type table in accordance with an embodiment of the invention.

DETAILED DESCRIPTION OF THE INVENTION

Figure 1:
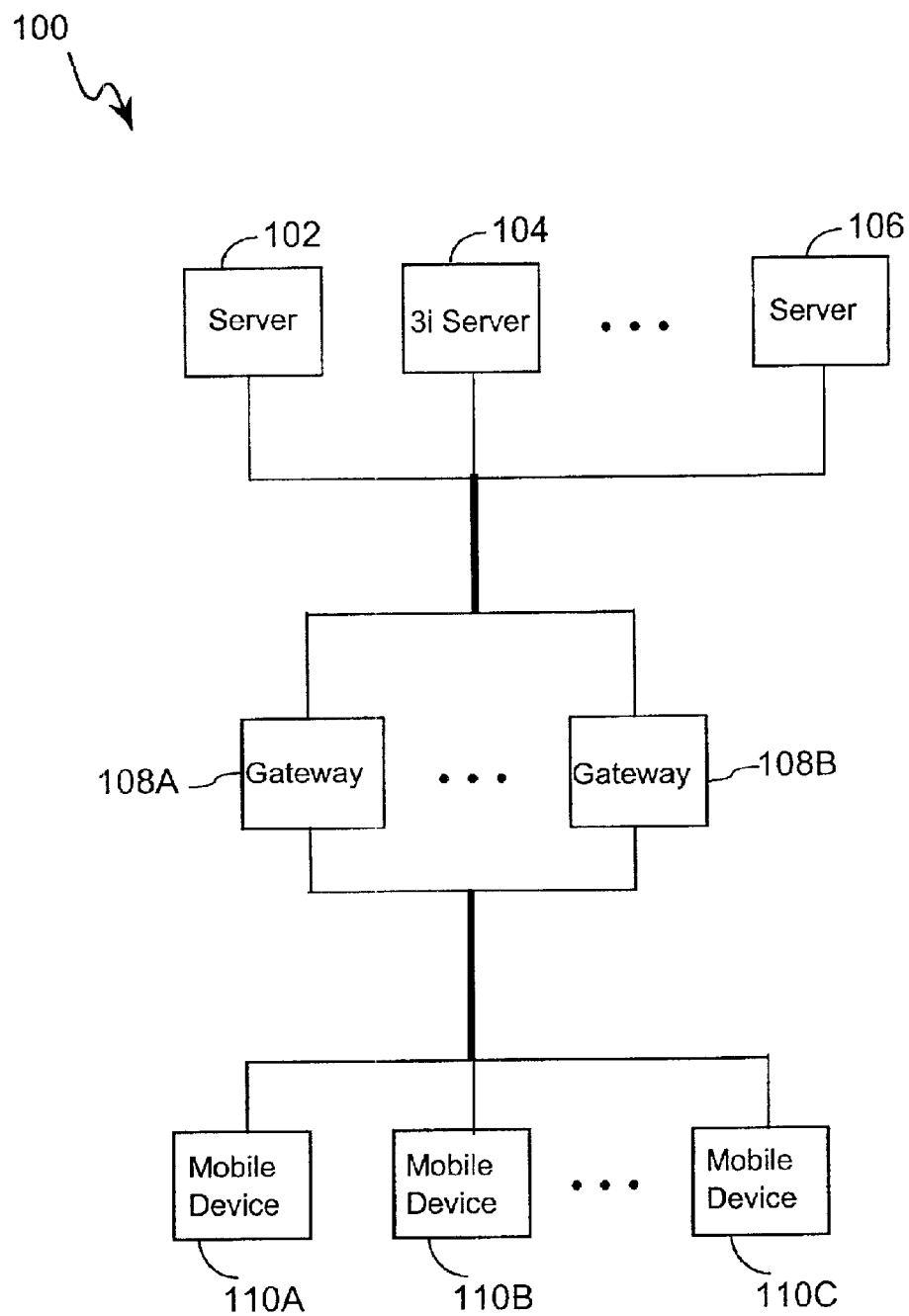
FIG. 1 schematically illustrates an exemplary system in accordance with an embodiment of the invention.

FIG. 1 illustrates an exemplary system 100. The system 100 includes multiple servers connected to multiple gateways that service multiple mobile devices. For ease of explanation, only a representative number of servers, gateways, and mobile devices are shown in FIG. 1. The system 100 includes servers 102–106, gateways 108A–108B, and mobile devices 110A–110C. In an exemplary embodiment, the server 104 is a compatible server (3i server) that is capable of differentially updating applications and data stored at the gateway 108 or the mobile device 110.

Figure 2:
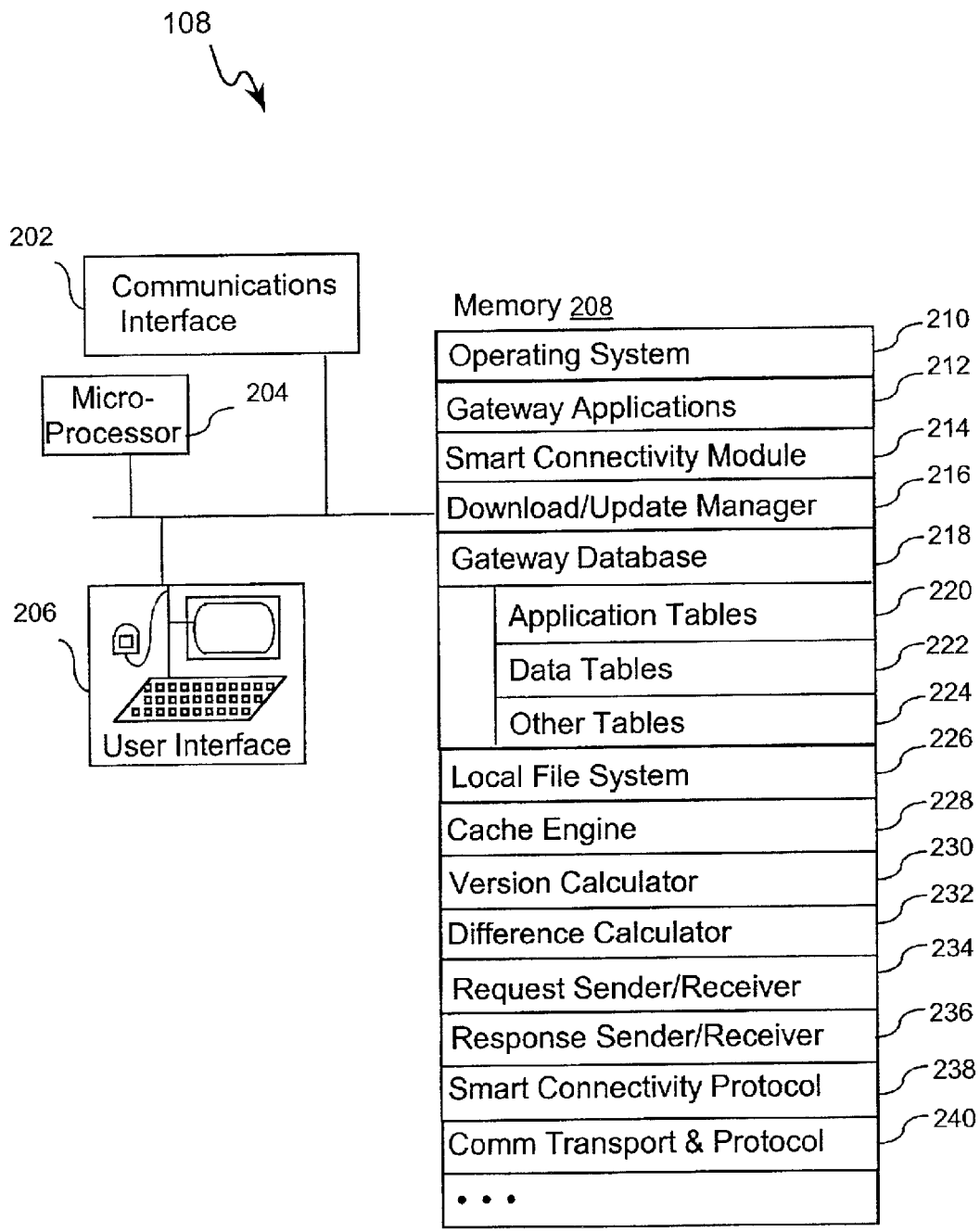
FIG. 2 schematically illustrates an exemplary gateway in accordance with an embodiment of the invention.

FIG. 2 schematically illustrates an exemplary gateway 108 in accordance with an embodiment of the invention. The gateway 108 includes a communications interface 202 for communicating with a network, a microprocessor 204, a user interface 2206, and a memory 208. In an exemplary embodiment, the user interface includes a user input device (e.g., keyboard) and an output device (e.g., screen). The memory 208 includes an operating system 210, gateway applications 212, a smart connectivity module 214, a download/update manager 216, a gateway database 218, a local file system 226, a cache engine 228, a version calculator 230, a difference calculator 232, a request sender/receiver 234, a response sender/receiver 236, a smart connectivity protocol 238, and a communications transport protocol module 240 for adapting to different transport protocols in the network. In an exemplary embodiment, the gateway database 218 includes a set of application tables 220, a set of data tables 222, and a set of other tables 224 for storing subscriber, cache storage, and other information.

In an exemplary embodiment, the gateway applications 212 provide standard gateway functions. The request sender/receiver 234 receives requests sent by subscribing mobile devices 110 and passes the requests to the smart connectivity module 214. The smart connectivity module 214 determines whether an application or data requested for execution or access is already stored in the local file system 226 and whether a cached application or data is up-to-date. The smart connectivity module 214 sends a request to a remote server 102–106 via the download/update manager 216 to download or update the requested application or data if it is not stored in the local file system 226 or if it is out-of-date, respectively. The smart connectivity module 214 calls the cache engine 228 to intelligently determine (based on a calculated cache benefit index) whether a downloaded application/data should be cached, and if so, whether there is enough space to do so. Additionally, the smart connectivity module 214 maintains meta information (i.e., synchronization version and app/data identification information, etc.) for all cached application/data in the gateway database 218 in one or more of the tables 220–224. The smart connectivity module 214 generates a response to the request from the mobile device 110 and calls the response sender/receiver 236 to send the response to the mobile device 110.

When an application/data is downloaded, cached, or sent to a mobile device 110, all files belonging to that application/data, including the executable files, configuration files, property files, online help files, etc., are processed as a bundle.

Communications between the mobile device 110 and the gateway 108 or between the gateway 108 and a 3i server 104 are based on the smart connectivity protocol 238 that is stacked on top of the communication transport and protocol 240 (e.g., wireless application protocol (WAP), TCP/IP, HTTP, infra-red data association (IrDA), or Bluetooth). Communications between the gateway 108 and other servers (non-3i servers) 102 or 106 are based only on the communication transport and protocol 240. When downloading from the server 102 or 106, the downloaded application/data needs to be further processed at the gateway 108. For example, the smart connectivity module 214 calls the version calculator 230 to generate version information regarding a downloaded application/data and calls the difference calculator 232 to generate one or more difference files by comparing a downloaded application/data to a cached application/data. Difference files are used to update cached applications/data in the local file system 226 of the gateway and/or the mobile device 110 differentially.

Figure 3:
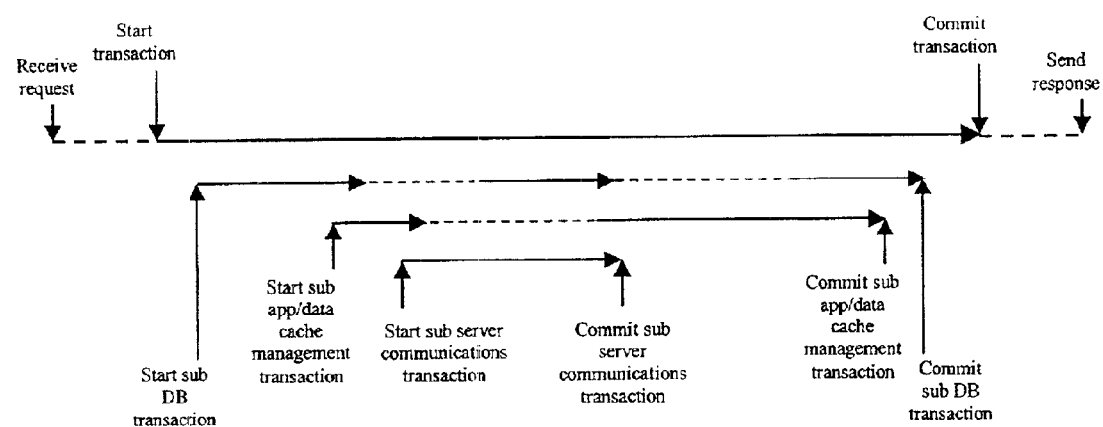
FIG. 3 schematically illustrates an exemplary two level transaction support process in accordance with an embodiment of the invention.

FIG. 3 illustrates an exemplary transaction and sub-transaction management in accordance with an embodiment of the invention. During each application/data downloading or application/data caching, the smart connectivity module 214 maintains the consistency and integrity among database operations and application/data cache space management. A transaction corresponding to an application/data update or status check is created after the smart connectivity module 214 initiates the update or status check request on the mobile device 110. The transaction is committed when the smart connectivity module 214 succeeds in the update or status check processes; otherwise, if the smart connectivity module 214 fails in the processes, the transaction is rolled back to its original state. In an exemplary embodiment, during a transaction processing, the smart connectivity module 214 may also create several sub-transactions within the transaction for various database operations. For example, the sub-transactions include an application or data cache space management transaction and communication transactions with the gateway 108 or a remote server 102. Sub-transactions become fully committed when the initial transaction becomes committed.

In an exemplary embodiment, the gateway database 218 includes a number of tables 220–224. Each table is designed to maintain a type of logical information. The smart connectivity module 214 updates the gateway database 218 and the local file system 226 in accordance with each operation performed. In an exemplary embodiment, the gateway database 218 is managed in the gateway 108 by a third-party (commercially available) database management system running on one or more UNIX servers. In one embodiment, fifteen tables are maintained in the gateway database 218. Exemplary tables are illustrated in FIGS. 4–18 below.

FIG. 4 illustrates an exemplary application identification table. The purpose of this table is to associate each application uniform resource locator (URL) to a unique identification.

FIG. 5 illustrates an exemplary data identification table. The purpose of this table is to associate each data URL to a unique identifier.

FIG. 6 illustrates an exemplary subscriber registration table. The purpose of this table is to maintain service subscriber registration and access control.

FIG. 7 illustrates an exemplary application registration table. The purpose of this table is to maintain application registration and access control on applications.

FIG. 8 illustrates an exemplary compression methods table. The purpose of this table is to associate each data compression method name to a unique identifier.

FIG. 9 illustrates an exemplary compatible (3i) server registration table. The purpose of this table is to maintain a list of all 3i servers in the system 100.

FIG. 10 illustrates an exemplary session management table. The purpose of this table is to maintain the properties of all live or reusable sessions.

FIG. 11 illustrates an exemplary application download/update table. The purpose of this table is to track the download and update histories of all applications ever downloaded by each subscribing mobile device 110.

FIG. 12 illustrates an exemplary data download/update table. The purpose of this table is to track the download and update histories of all data ever downloaded by each subscribing mobile device 110.

FIG. 13 illustrates an exemplary application storage table. The purpose of this table is to maintain the meta information associated with all cached applications in each gateway 108.

FIG. 14 illustrates an exemplary data storage table. The purpose of this table is to maintain the meta information associated with all cached data in each gateway 108.

FIG. 15 illustrates an exemplary mobile application cache table. The purpose of this table is to maintain a list of applications currently cached at each subscribing mobile device 110.

FIG. 16 illustrates an exemplary mobile application use table. The purpose of this table is to maintain application use histories by subscribing mobile devices.

FIG. 17 illustrates an exemplary broadcast table. The purpose of this table is to maintain application broadcast messages that should be piggybacked to mobile devices 110.

FIG. 18 illustrates an exemplary configuration table. The purpose of this table is to set and maintain a set of configuration parameters that control the behavior of the gateway 108.

When the cache engine 228 is called, a cache benefit index (CBI) is calculated to determine if a downloaded application or data should be cached in the local file system 226. Generally, the CBI represents the total traffic volume saved in bytes between a remote server 102–106 and the gateway 108 if an application or data is cached on the gateway 108. Thus, the greater the CBI, the greater total traffic volume saved and the more benefit for caching an application or data. Calculating the CBI for each requested application or data ensures intelligent application/data caching on a gateway 108, such that an optimal set of applications and data is cached in the limited local file system space to maximize traffic reduction between the gateway 108 and remote servers 102–106.

The CBI associated with each application or data is dynamically calculated. When an application or data is requested for download or update by a subscribing mobile device 110, the CBI associated with that application or data is calculated or recalculated, respectively. Typically, CBI calculations take into account these parameters: the last application execution or data access time stamp, the application or data size, the frequency of application or data downloads and updates in mobile devices 110, an average update rate for the application or data cached in mobile devices 110, the frequency of application or data updates in the gateway 108, the average update rate of application or data cached at the gateway 108, and/or other parameters.

Typically, an application/data download request is initiated by a user at a mobile device 110. After the application/data is downloaded from a server 102–106 and cached in the local file system 226 of the gateway 108, the volume of traffic between the server 102–106 and the gateway 108 for purposes of downloading that application or data becomes zero; thus, caching an application/data in the local file system 226 at the gateway 108 reduces traffic. Once an application/data is cached, the volume of traffic between the server 102–106 and the gateway 108 for purposes of updating that cached application/data increases; thus, the need to update a cached application or data in the local file system 226 at the gateway 108 increases traffic.

In an exemplary embodiment, "$t_1$" represents the last application execution or data access time stamp, "$t_n$" represents the current time stamp, and EFFECT_PERIOD is as defined in the configuration table (see FIG. 18). In one embodiment, any record in the application/data storage tables (see FIGS. 13–14) whose last execution or access time stamp ($t_1$) is less than or equal to $t_n$–EFFECT_PERIOD and having a CBI=0 can be deleted from those tables.

For applications or data whose last execution or access is greater than $t_n$–EFFECT_PERIOD, their CBIs are calculated each time a user request is received to execute or access the applications or data.

For an application/data downloaded from the gateway 108 to the mobile device 110, the current number of downloads is equal to the last number of downloads plus one: $\text{nDownload}^{gm}{}_{new}=\text{nDownload}^{gm}{}_{old}+1$. Similarly, if a cached application/data in the mobile device 110 receives an update from the gateway 108, the current number of updates is equal to the last number of updates plus one: $\text{nUpdate}^{gm}{}_{new}=\text{nUpdate}^{gm}{}_{old}+1$. The new update rate, $\text{updateRate}^{gm}{}_{new}$, is the average update rate after the current update. The $\text{rate}^{gm}{}_{new}$ is the current update traffic volume divided by the application or data size multiplied by 100. The update $\text{Rate}^{gm}{}_{new}$ can be calculated based on the old update rate ($\text{updateRate}^{gm}{}_{old}$), the last number of updates ($\text{nUpdateg}^{gm}{}_{old}$), the current number of updates ($\text{nUpdate}^{gm}{}_{new}$), and the $\text{rate}^{gm}{}_{new}$ in the following equation:

$$\text{updateRate}^{gm}{}_{new}=(\text{updateRate}^{gm}{}_{old}*\text{nUpdate}^{gm}{}_{old}+\text{rate}^{gm}{}_{new})/\text{nUpdate}^{gm}{}_{new}$$

For an application/data updated from a server 102–106 to the gateway 108, the number of current updates is equal to the last number of updates plus one: $\text{nUpdate}^{sg}{}_{new}=\text{nUpdate}^{sg}{}_{old}+1$. The new update rate, $\text{updateRate}^{sg}{}_{new}$, is the average update rate after the current update. The $\text{rate}^{sg}{}_{new}$ is the current update traffic volume divided by the application or data size multiplied by 100. The $\text{updateRate}^{sg}{}_{new}$ can be calculated based on the old update rate ($\text{updateRate}^{sg}{}_{old}$), the last number of updates ($\text{nUpdate}^{gm}{}_{old}$), the current number of updates ($\text{nUpdate}^{gm}{}_{new}$), and the $\text{rate}^{sg}{}_{new}$ in the following equation:

$$\text{updateRate}^{sg}{}_{new}=(\text{updateRate}^{sg}{}_{old}*\text{nUpdate}^{sg}{}_{old}+\text{rate}^{sg}{}_{new})/\text{nUpdate}^{sg}{}_{new}$$

Based on the discussion above, the CBI associated with an application or data can be calculated using the following equation: CBI=total download cost (TDC)–total update cost (TUC). For an application, $\text{TDC}=\text{nDownload}^{gm}\times\text{appSize}+\text{nUpdate}^{gm}\times\text{updateRate}^{gm}\times\text{appSize}/100$ and $\text{TUC}=\text{nUpdate}^{sg}\times\text{appSize}\times\text{updateRate}^{sg}/100$. For data, $\text{TDC}=\text{nDownload}^{gm}\times\text{dataSize}+\text{nUpdate}^{gm}\times\text{updateRate}^{gm}\times\text{dataSize}/100$ and $\text{TUC}=\text{nUpdate}^{sg}\times\text{dataSize}\times\text{updateRate}^{sg}/100$. As shown, the greater the TDC, the more benefit for caching an application or data; the greater the TUC, the less benefit for caching an application or data.

Figure 19:
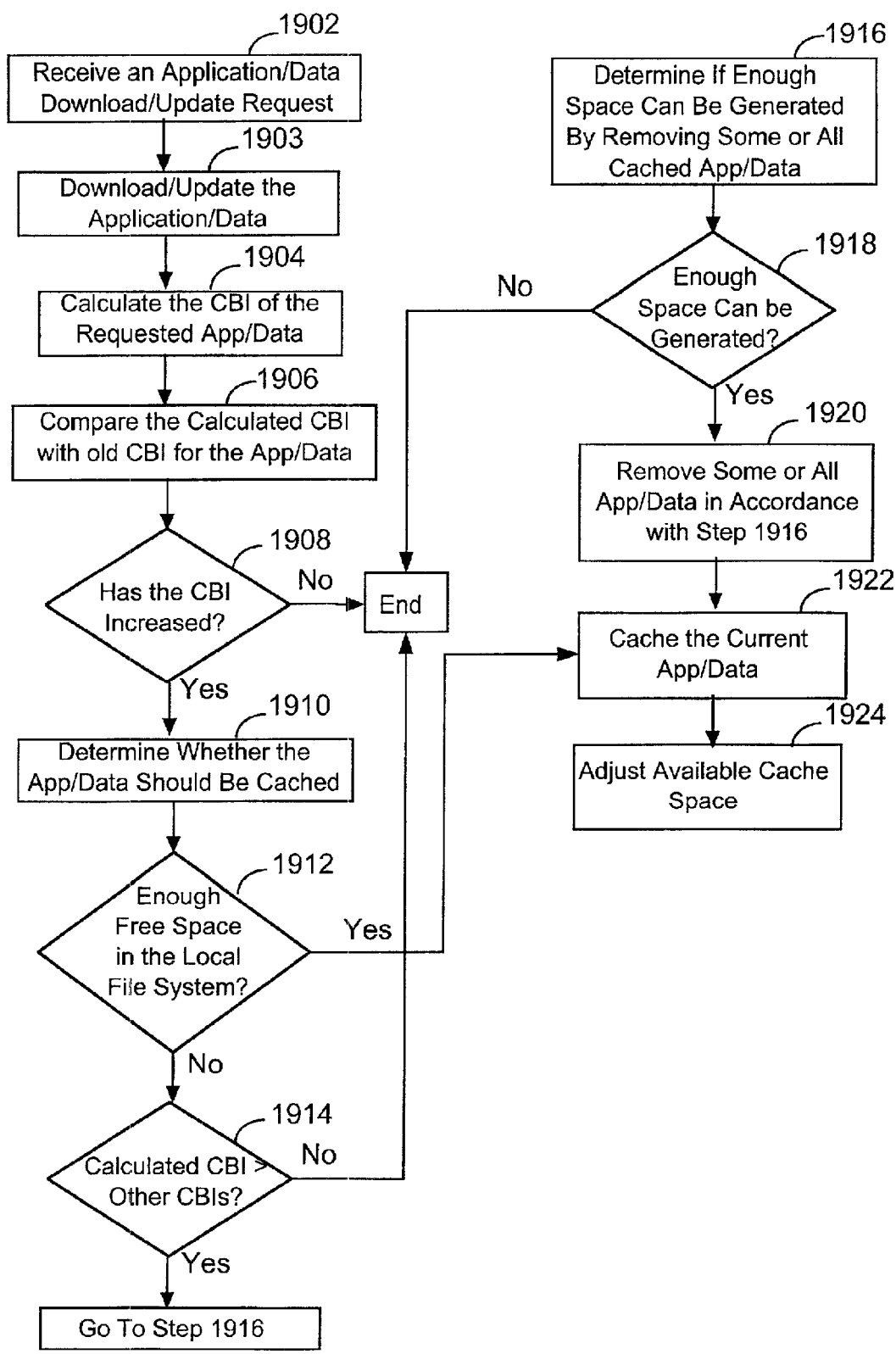
FIG. 19 illustrates an exemplary process in accordance with an embodiment of the invention.

FIG. 19 illustrates an exemplary process in accordance with an embodiment of the invention. At step 1902, a request to download or update an application/data is received by the gateway 108. The requested application/data is downloaded/updated ("current application/data") (step 1903). The CBI for the current application/data is calculated/recalculated ("calculated CBI") (step 1904). Next, the calculated CBI is compared to an old CBI, if any, for the current application/data (step 1906). Note that the old CBI is equal to zero when the application/data was first downloaded. If the calculated CBI is greater than the old CBI (step 1908), whether the current application/data should be cached is determined (step 1910). If the calculated CBI is less than or equal to the old CBI (step 1908), the process ends.

In an exemplary embodiment, whether there is enough free space in the local file system 226 to store the current application/data is determined (step 1912). If there is enough free space in the local file system 226 to cache the current application/data, the current application/data is cached (step 1922) and available cache space in the local file system 226 is appropriately adjusted (step 1924). In an exemplary embodiment, after the current application/data is cached, the total free space in the local file system 226 is decreased by the size of the current application/data. For example, if "$FM_c$" represents the free space in the local file system 226, "$SZ_{ad}$" represents the actual size of the current application/data, and "$SZ_{mi}$" represents the size of the current application/data's meta information, then if $FM_c \geq SZ_{ad}+SZ_{mi}$, there is enough free space to cache the current application/data. In an exemplary embodiment, after caching the current application/data, a new total free space in the local file system is calculated as follows: $FM_{cnew}=FM_c-(SZ_{ad}+SZ_{mi})$.

Referring back to step 1912, if there is not enough free space in the local file system 226 to cache the current application/data, the calculated CBI is compared to CBIs of other applications/data cached in the local file system 226 to determine whether the current application/data should be cached (step 1914). If the calculated CBI is not greater than the other CBIs, the process ends and the current application/data is not cached in the local file system 226. If the calculated CBI is greater than the other CBIs, whether removal of some or all of the cached application/data from the local file system 226 will generate enough free space is determined. In an exemplary embodiment, only cached applications/data having a CBI less than the calculated CBI should be potentially removable. In other words, cached applications/data having a CBI greater than or equal to the calculated CBI should not be removed. If removal of some or all of such applications/data (with smaller CBI than calculated CBI) can generate enough space to cache the current application/data (step 1918), the minimum number of such applications/data is removed to generate just enough space for the current application/data (step 1920). In an exemplary embodiment, when there are "n" cached application/data that have a CBI less than the calculated CBI, the following equations are solved:

$$\text{Minimize} \sum_{qi=1}^{m} CBI^{qi}$$

$$\text{Where} \sum_{qi=1}^{m} CBI^{qi} < CBI^0,$$

$$FM_c + \Sigma(SZ_{ad}{}^{qi}+SZ_{mi}{}^{qi})^3 SZ_{ad}{}^0 + SZ_{mi}{}^0$$

where the CBI of the $i^{th}$ ($1 \leq i \leq n$) application/data is represented as "$CBI^i$", the actual size of the $i^{th}$ application/data is represented by "$SZ_{ad}{}^i$," the size of the $i^{th}$ application/data's meta information is represented by "$SZ_{mi}{}^i$," $m \leq n$, $1 \leq qi \leq n$, $CBI^{qi}$, $SZ_{ad}{}^{qi}$, $SZ_{mi}{}^{qi}$ represent the CBI, $SZ_{ad}$, $SZ_{mi}$ of the $qi^{th}$ application or data, respectively, and $CBI^0$, $SZ_{ad}{}^0$, $SZ_{mi}{}^0$ represent the CBI, $SZ_{ad}$, $SZ_{mi}$ of the current application or data, respectively.

By solving the above equations, the smallest necessary number of cached application/data with their respective CBIs less than the current CBI is removed from the local file system 226 to accommodate the caching of the current application/data.

After the removal of some or all of the cached application/data (that generates enough space to cache the current application/data), the current application/data is cached (step 1922) and the total available space in the local file system 226 is accordingly adjusted (step 1924). In an exemplary embodiment, the new total available space is calculated as follows:

$$FM_{cnew} = FM_c + \sum_{qi=1}^{m}(SZ_{ad}^{qi} + SZ_{mi}^{qi}) - (SZ_{ad}^{0} + SZ_{mi}^{0})$$

Referring back to step 1918, if the removal of some or all of the cached application/data still does not generate enough space to cache the current application/data, the current application/data is not cached.

Generally, operations for intelligently caching application and data on the gateway 108 are driven by requests from subscribing mobile devices 110. FIG. 20 illustrates a table listing exemplary requests from the mobile devices 110. The smart connectivity module 214 processes each request received from the mobile devices 110.

Figure 21A:
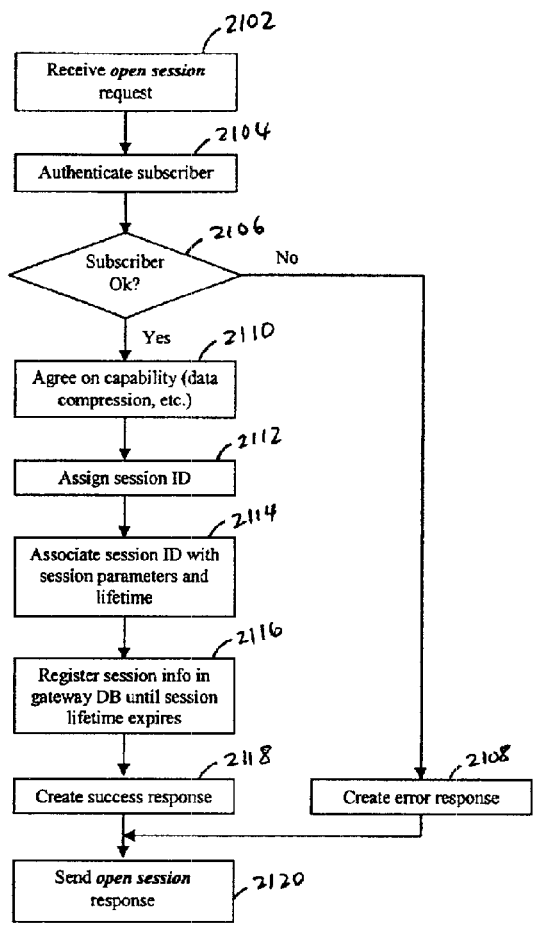
FIG. 21A illustrates an exemplary process to open a communication session in accordance with an embodiment of the invention.

FIG. 21A illustrates an exemplary process when an open session request is received in accordance with an embodiment of the invention. At step 2102, an open session request is received at the gateway 108. In response to the request, the subscriber is authenticated (step 2104). In an exemplary embodiment, a subscriber ID is identified from the open session request, then the subscriber registration table (see FIG. 6) in the gateway database 218 is searched for a record associated with the subscriber ID. If such a record exists, the subscriber is authenticated (step 2106); otherwise, the subscriber cannot be authenticated and an error response is generated (step 2108). Next, if the subscriber is authenticated, the smart connectivity module 214 proceeds to agree (or disagree) to a proposed capability of the subscriber in the open session request (step 2110). For example, the subscriber may have proposed a particular data compression method. In this case, the compression method registration table (see FIG. 8) is searched in the gateway database 218 for a record that matches the proposed compression method. If the search is not successful, no compression method will be used for the current session. If the search is successful, the proposed compression method is selected as the compression method for the current session.

Next, a new session ID is assigned to the current session (step 2112). The smart connectivity module 214 increases the LAST_SESSION_ID property value in the configuration table (see FIG. 18) by 1 and assigns that value as the session ID for the current session, and updates the configuration table to reflect the new LAST_SESSION_ID property value.

The assigned new session ID is associated with session parameters and a lifetime value (step 2114). In an exemplary embodiment, the smart connectivity module 214 reviews the SESSION_TTL property value in the configuration table. The SESSION_TTL property value represents the lifetime of the current session in seconds. Next, session information is registered into the gateway database 218 until the session's lifetime expires (step 2116). In an exemplary embodiment, the smart connectivity module 214 inserts a new record into the session management table (see FIG. 10). In one embodiment, the new record includes the session ID, the subscriber ID, the data compression method ID, a starting time stamp of the session, the smart connectivity protocol 238 version, and other session property values. A success response is created (step 2118) and sent to the mobile device 110 to indicate that a session has been opened (step 2120).

Figure 21B:
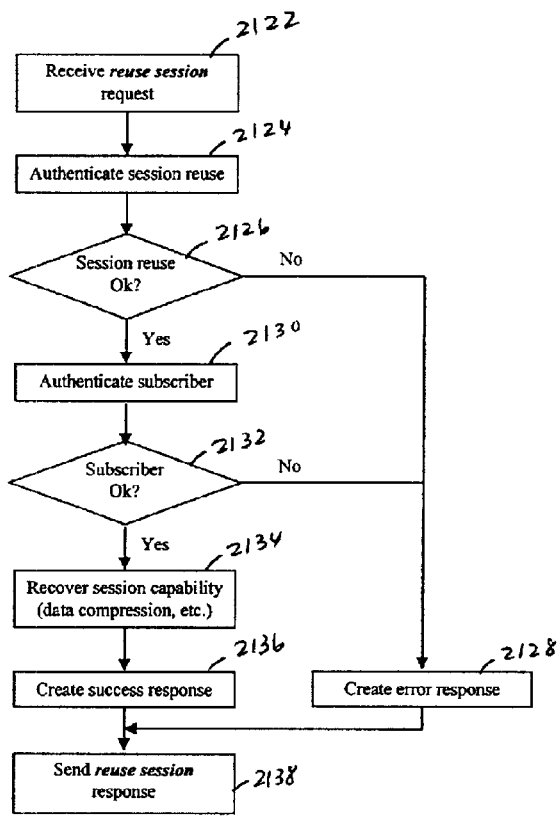
FIG. 21B illustrates an exemplary process to reuse a communication session in accordance with an embodiment of the invention.

FIG. 21B illustrates an exemplary process when a reuse session request is received by the gateway 108 in accordance with an embodiment of the invention. At step 2122, a session reuse request is received by the gateway 108 from a mobile device 110. The session reuse request is authenticated (step 2124). In an exemplary embodiment, the session ID is identified from the session reuse request and the session management table (see FIG. 10) is searched for a matching record based on the session ID. If a matching record exists and the session lifetime has not expired, the reuse session is authenticated (step 2126). Otherwise, authentication failed and an error response is created and sent to the mobile device 110 (step 2128).

At step 2130, the subscriber ID is identified from the reuse session request and the subscriber registration table (see FIG. 6) is searched for a matching record based on the subscriber ID. If a matching record exists, the subscriber is authenticated (step 2132). Otherwise, authentication failed and an error response is created and sent to the mobile device 110 (step 2128).

Next, session capabilities are recovered (step 2134). In an exemplary embodiment, the smart connectivity module 214 caches identified session information in a working memory. A success response is generated (step 2136) and sent in a reuse session response to the mobile device 110 (step 2138). In an exemplary embodiment, the session capability information is included in the reuse session response so that both the mobile device 110 and the gateway 108 can recover a session created previously.

Figure 22A:
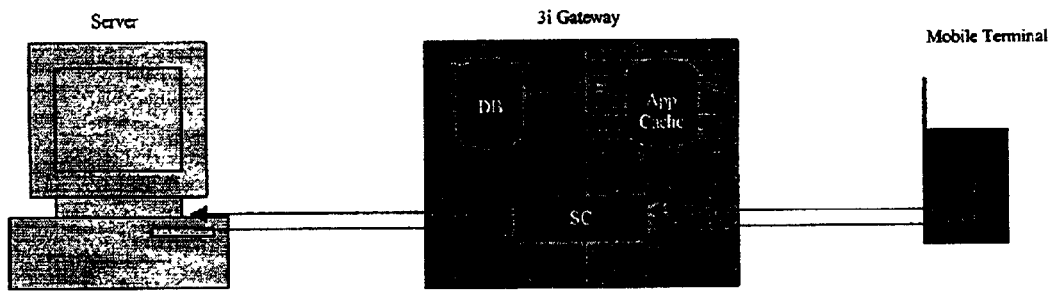
FIGS. 22A–D illustrate four modes of exemplary application download processes in accordance with an embodiment of the invention.
Figure 22B:
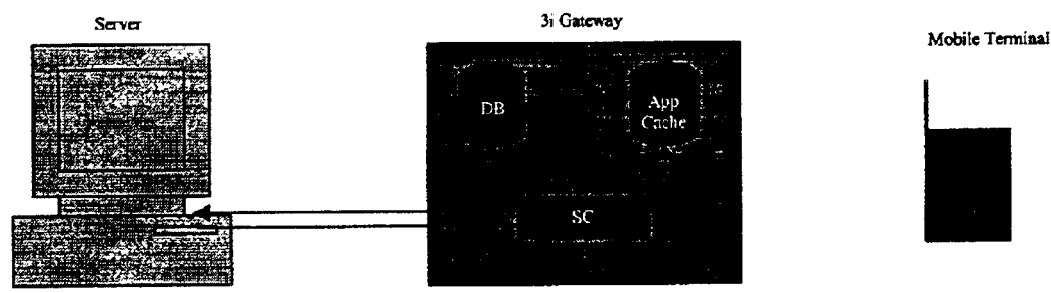
Figure 22C:
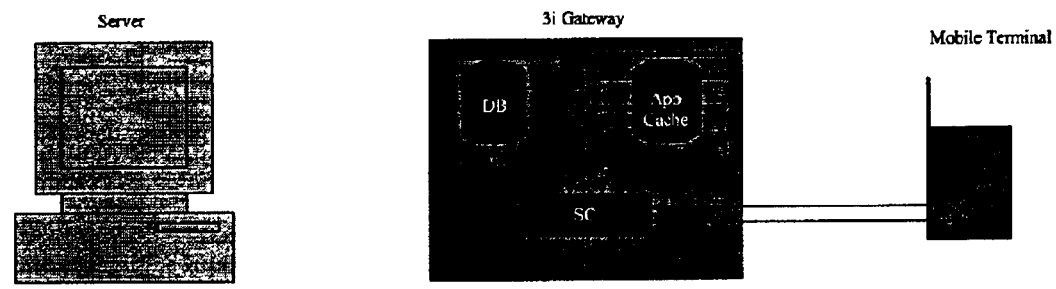
Figure 22D:
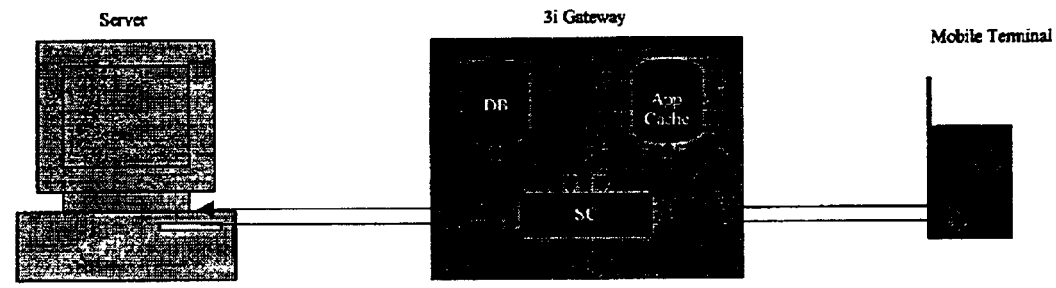

FIGS. 22A–D schematically illustrate four modes of exemplary application download processes in accordance with an embodiment of the invention. In FIG. 22A, the gateway 108 downloads an application/data from a server 102–106 and then downloads the application/data to the mobile device 110 without caching the application/data. In FIG. 22B, the gateway 108 downloads an application/data from a server 102–106 and caches the application/data without downloading it at the mobile device 110. In FIG. 22C, an application/data is already cached on the gateway 108 and the cached version is up-to-date; thus, the application/data is downloaded from the gateway 108 to the mobile device 110 directly. In FIG. 22D, an application/data is already cached on the gateway 108. However, the cached application/data is out-of-date, so the gateway 108 first updates the cached application/data from the server 102–106 then downloads the updated application/data to the mobile device 110.

FIGS. 23A–D illustrate an exemplary download process in accordance with an embodiment of the invention. At step 2302, an application download request is received from a mobile device 110. The application requested is authenticated (step 2304). In an exemplary embodiment, an application URL is identified from the application download request. The application identification table (see FIG. 4) and the application registration table (see FIG. 7) in the gateway database 218 are searched using the application URL. If a matching record exists and the associated application is not disabled (e.g., the flagSet field in the application registration table is "off"), then the application is authenticated. If the application is not authenticated, an error response is created (step 2308) and sent to the requesting mobile device 110. If the application is authenticated (step 2306), then whether the application is already cached and up-to-date is checked (step 2310). If the application is not cached (step 2312), whether a server, where the application can be downloaded, is a 3i server is determined (step 2314). If the server is a 3i server, the process continues in FIG. 23B. Otherwise, the process continues in FIG. 23C.

Referring back to step 2312, if the application is already cached, whether the application is up-to-date is determined (step 2316). If the application is not up-to-date, the process continues in FIG. 23D. If the application is up-to-date, the application download/update histories table (see FIG. 11) is updated (step 2318). Next, the CBI for this application is recalculated (step 2320). In an exemplary embodiment, the recalculated CBI is equal to the old CBI plus the application size. The application storage table (see FIG. 13) is updated by replacing the old CBI with the recalculated CBI (step 2322). The local file system 226 is accessed to load the cached application (step 2324). The gateway database 218 is accessed to load meta information related to the application (step 2326). In an exemplary embodiment, the application registration table (see FIG. 7) in the gateway database 218 is searched for meta information associated with the application. Next, the gateway database 218 is accessed to load broadcast information, if any (step 2328). A success response is generated (step 2330) and an application download response is sent to the requesting mobile device 110 (step 2332). In an exemplary embodiment, the application download response includes application contents, application meta information, and broadcast message, if any.

Figure 23A:
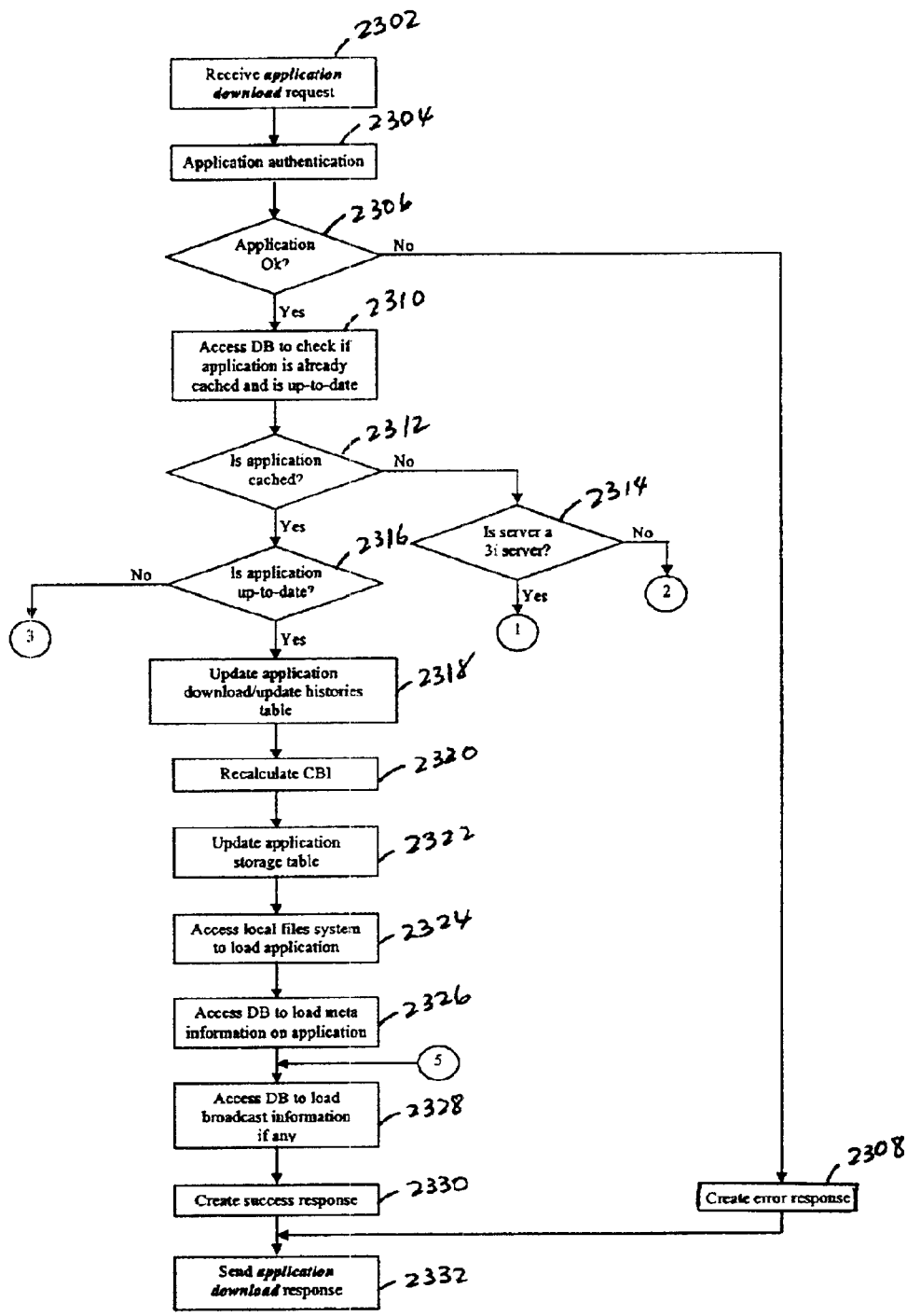
FIGS. 23A–D illustrate an exemplary application download process in accordance with an embodiment of the invention.
Figures 23B, 23C:
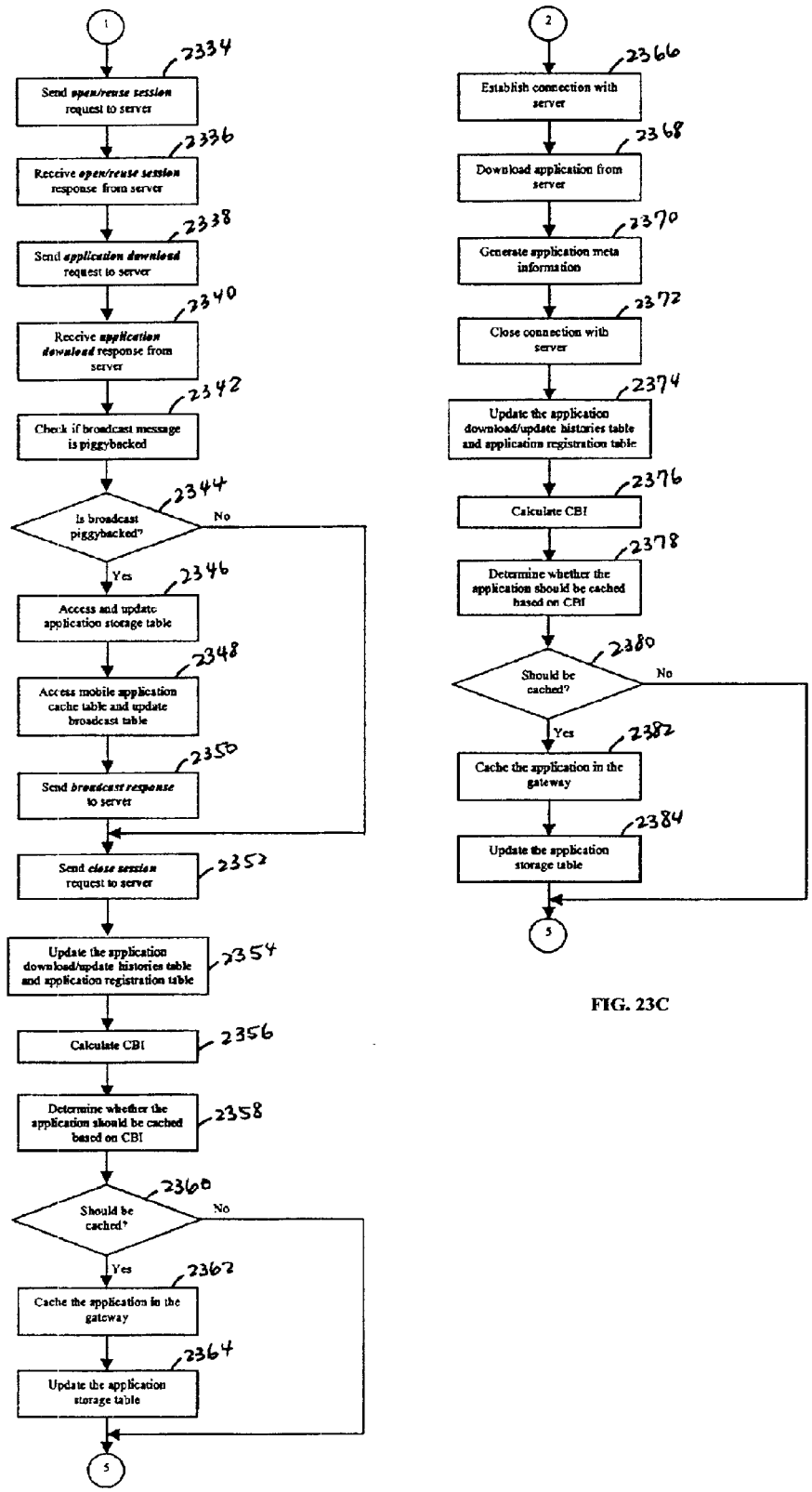

FIG. 23B illustrates an exemplary application download process from a 3i server 104 in accordance with an embodiment of the invention. At step 2334, an open/reuse communication session request is sent to the 3i server 104. An open/reuse communication session response is received (step 2336). Next, an application download request is sent to the server 104 (step 2338) and an application download response is received from the server 106 (step 2340). In an exemplary embodiment, the response includes the requested application. The response is parsed to determine whether a broadcast message is piggybacked (step 2342). If no broadcast message is piggybacked (step 2344), the process continues at step 2352. If a broadcast message is piggybacked (step 2344), the application storage table (see FIG. 13) is accessed and updated (step 2346). In an exemplary embodiment, a broadcast message includes an application URL and an application version for each of one or more applications. The application storage table is searched for the appVer and flagSet fields of each record that is associated with an application URL component in the broadcast message. The appVer of a matching record and an application version component in the broadcast message are compared. If the versions are different, then set a corresponding flagSet field to indicate that the associated application is out-of-date. This process repeats for all applications in the broadcast message. Next, the mobile application cache table (see FIG. 15) and the broadcast table (see FIG. 17) are accessed (step 2348). In an exemplary embodiment, the mobile application cache table is searched for the "subId" field of all records that are associated with the application URLs in the broadcast message. For every identified subId field, a record comprising the subId, the application URL, and the application version is created and inserted into the broadcast table. Next, a broadcast response is sent back to the 3i server 104 (step 2350).

At step 2352, a close session request is sent to the server 104 and the communication is disconnected. The application download/update histories table (see FIG. 11) and the application registration table (see FIG. 7) are updated (step 2354). In an exemplary embodiment, a new record corresponding to the downloaded application is created and inserted into the application download/update histories table. In another exemplary embodiment, an existing record corresponding to the downloaded application in the application download/ update histories table is updated as follows: the "appSize" field value is replaced with the application size of the downloaded application, the "nDownload" field is incremented by 1, and the "timestamp" field value is replaced by the current time. A corresponding record in the application registration table is updated as follows: the "appVer" field is replaced with the version of the downloaded application. Next, the CBI for the downloaded application is calculated (step 2356). In an exemplary embodiment, the CBI is equal to the TDC. Whether the downloaded application should be cached is determined based on the calculated CBI (step 2358). If not, the process continues at step 2328 in FIG. 23A. If the downloaded application is to be cached (step 2360), the application is cached in the local file system 226 at the gateway 108 (step 2362). Next, the application storage table (see FIG. 13) is updated (step 2364) and the process continues at step 2328 in FIG. 23A. In an exemplary embodiment, a new record corresponding to the downloaded application is created and inserted into the application storage table.

FIG. 23C illustrates an exemplary application download process from a non-3i server 102 or 106 in accordance with an embodiment of the invention. At step 2366, a connection with the server 102 is established. Next, an application download request is sent, a response is received, and the application is downloaded from the remote server 102 (step 2368). Application meta information (e.g., application version, file versions, number of files, application size, etc.) associated with the downloaded application is generated (step 2370). The communication is disconnected (step 2372). The application download/update histories table (see FIG. 11) and the application registration table (see FIG. 7) are updated (step 2374). In an exemplary embodiment, a new record corresponding to the downloaded application is created and inserted into the application download/update histories table. In another exemplary embodiment, an existing record corresponding to the downloaded application in the application download/update histories table is updated as follows: the "appSize" field value is replaced with the application size of the downloaded application, the "nDownload" field is incremented by 1, and the "timestamp" field value is replaced by the current time. A corresponding record in the application registration table is updated as follows: the "appVer" field is replaced with the version of the downloaded application. Next, the CBI for the downloaded application is calculated (step 2376). In an exemplary embodiment, the CBI is equal to the TDC. Whether the downloaded application should be cached is determined based on the calculated CBI (step 2378). If not, the process continues at step 2328 in FIG. 23A. If the downloaded application is to be cached (step 2380), the application is cached in the local file system 226 at the gateway 108 (step 2382). Next, the application storage table (see FIG. 13) is updated (step 2384) and the process continues at step 2328 in FIG. 23A. In an exemplary embodiment, a new record corresponding to the downloaded application is created and inserted into the application storage table.

Figure 23D:
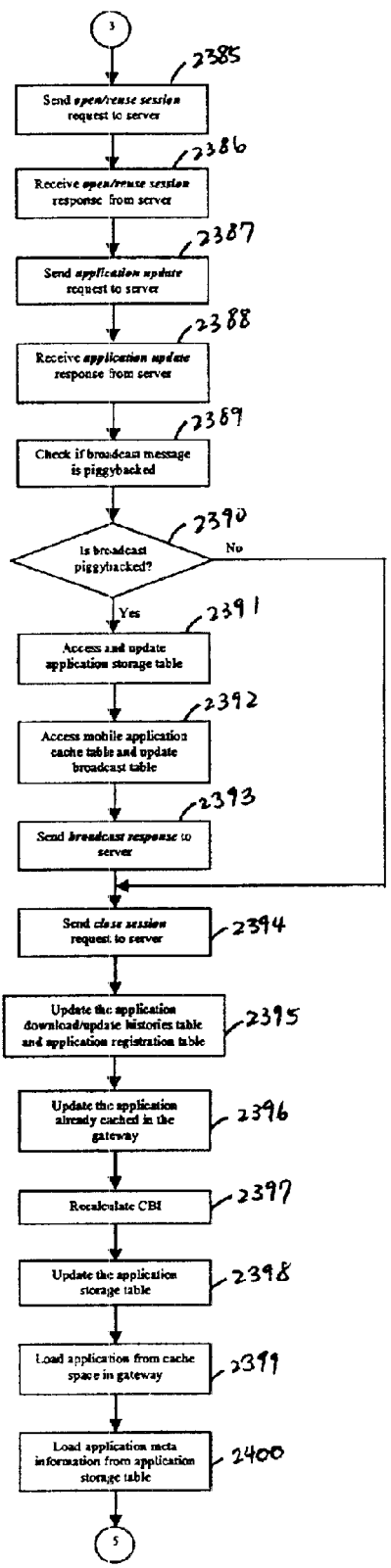

FIG. 23D illustrates an exemplary application update process from the 3i server 104 in accordance with an embodiment of the invention. At step 2385, an open/reuse communication session request is sent to the 3i server 104. An open/reuse communication session response is received (step 2386). Next, an application update request is sent to the server 104 (step 2387) and an application update response is received from the server 106 (step 2388). In an exemplary embodiment, the update response includes at least one difference file for updating the application differentially. The response is parsed to determine whether a broadcast message is piggybacked (step 2389). If no broadcast message is piggybacked (step 2390), the process continues at step 2394. If a broadcast message is piggybacked (step 2390), the application storage table (see FIG. 13) is accessed and updated (step 2391). In an exemplary embodiment, a broadcast message includes an application URL and an application version for each of one or more applications. The application storage table is searched for the appVer and flagSet fields of each record that is associated with an application URL component in the broadcast message. The appVer of a matching record and an application version component in the broadcast message are compared. If the versions are different, then set a corresponding flagSet field to indicate that the associated application is out-of-date. This process repeats for all applications in the broadcast message. Next, the mobile application cache table (see FIG. 15) and the broadcast table (see FIG. 17) are accessed (step 2392). In an exemplary embodiment, the mobile application cache table is searched for the "subId" field of all records that are associated with the application URLs in the broadcast message. For every identified subId field, a record comprising the subId, the application URL, and the application version are created and inserted into the broadcast table. Next, a broadcast response is sent back to the 3i server 104 (step 2393).

At step 2394, a close session request is sent to the server 104 and the communication is disconnected. The application download/update histories table (see FIG. 11) and the application registration table (see FIG. 7) are updated (step 2395). In an exemplary embodiment, a corresponding record in the application download/update histories table is updated as follows: the "appSize" field value is replaced with the application size of the downloaded application, the "nDownload" field is incremented by 1, and the "timestamp" field value is replaced by the current time. A corresponding record in the application registration table is updated as follows: the "appVer" field is replaced with the version of the downloaded application. Next, the application cached in the gateway 108 is updated based on the at least one difference file (step 2396). A new CBI is calculated for the updated application (step 2397). In an exemplary embodiment, the new CBI is equal to the old CBI plus the updated application size minus the size difference between the updated application and the original application (diffSize). In another exemplary embodiment, the "nUpdate" field and the "updateRate" field are also updated, where the nUpdate field is incremented by 1 and the updateRate field is equal to: (old updateRate$^{sg}$×old nupdate$^{sg}$+diffSize×100/new appSize)/new nUpdate$^{sg}$, where new appSize is the size of the updated application.

Next, the application storage table is updated (step 2398). In an exemplary embodiment, a record associated with the updated application in the application storage table is updated as follows: the "nFile," "fnames," "fVers," "nextRel," "lang," "flagSet," "nUpdate," "updateRate," "CBI," and "updateItvl" fields are updated with new values. In an exemplary embodiment, a new updateItvl is equal to (1−UPDATE_TM_WEIGHT)×old updateItvl+UPDATE_TM_WEIGHT×(timestamp$_{now}$−lastUpdate), where UPDATE_TM_WEIGHT is as defined in Table 18, the lastUpdate is equal to the time of the last update, and the timestamp$_{now}$ is the current time. Next, the application is loaded from the local file system 226 on the gateway 108 (step 2399), the associated meta information is loaded from the application storage table in the gateway database 218 (step 2400), and the process continues at step 2328 in FIG. 23A.

Figure 24A:
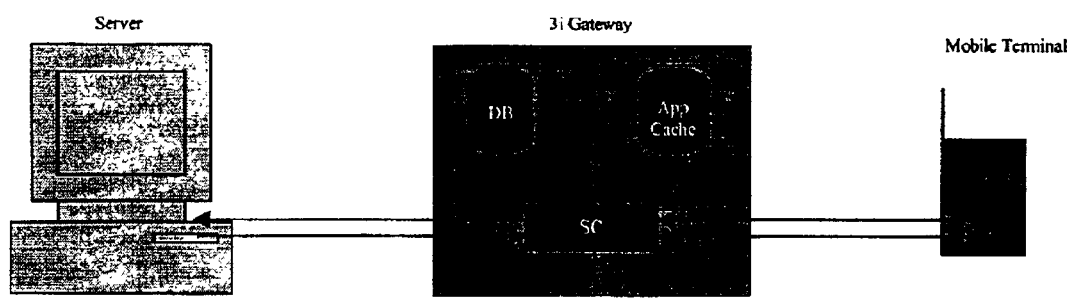
FIGS. 24A–C illustrate three modes of exemplary application update processes in accordance with an embodiment of the invention.
Figure 24B:
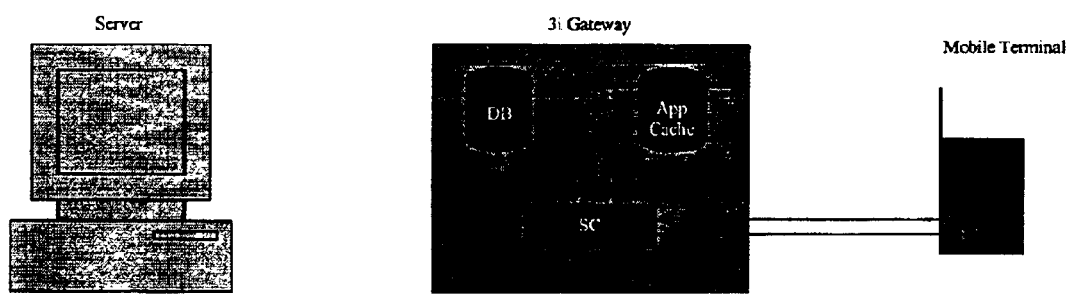
Figure 24C:
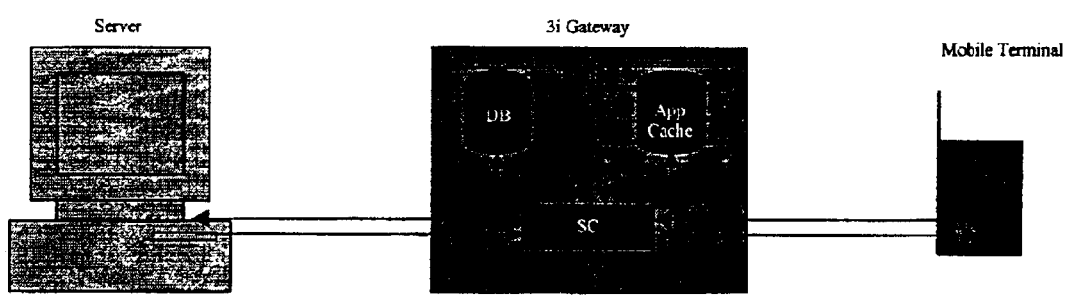

FIGS. 24A–24C schematically illustrate three modes of exemplary application update processes in accordance with an embodiment of the invention. In FIG. 24A, the gateway 108 facilitates a direct application/data update between a server 102–106 and the mobile device 110 without caching the application/data. In FIG. 24B, a requested application is already cached at the gateway 108 and the application is up-to-date; the gateway 108 directly updates the application at the mobile device 110 without contacting the server 102–106. In FIG. 24C, a requested application is already cached at the gateway 108 and the cached version is out-of-date; the gateway 108 updates the cached application with the server 102–106 then updates the application at the mobile device 110.

FIGS. 25A–D illustrate an exemplary application update process in accordance with an embodiment of the invention. At step 2502, an application update request is received. The application requested is authenticated (step 2504). In an exemplary embodiment, an application URL is identified from the application update request and the application identification table (see FIG. 4) and the application registration table (see FIG. 7) in the gateway database 218 are searched using the application URL. If a matching record exists and the associated application is not disabled (e.g., the flagSet field in the application registration table is "off"), then the application is authenticated. If the application is not authenticated, an error response is created (step 2508) and sent to the requesting mobile device 110. If the application is authenticated (step 2506), then whether the application is already cached is checked (step 2510). If the application is not cached (step 2512), whether a server, where the application can be downloaded, is a 3i server is determined (step 2514). If the server is a 3i server, the process continues in FIG. 25B. Otherwise, the process continues in FIG. 25C.

Referring back to step 2512, if the application is already cached, whether the application is up-to-date is determined (step 2516). If the application is not up-to-date, the process continues in FIG. 25D. If the application is up-to-date, the application download/update histories table (see FIG. 11) is updated (step 2518). In an exemplary embodiment, a new updateRate field is calculated (e.g., new updateRate=(old updateRate×old nUpdate+diffSize×100/appSize) and the "timestamp" field is updated with the current time stamp. Next, the CBI for this application is recalculated (step 2520). The application storage table (see FIG. 13) is updated by replacing the old CBI with the recalculated CBI (step 2522). In an exemplary embodiment, a new CBI is equal to the old CBI-diffSize, where diffSize is the size difference between the new and old versions of the application. The local file system 226 is accessed to load the difference (i.e., at least one difference file) between the updated application and the original application at the mobile device 110 (step 2524). The gateway database 218 is accessed to load meta information related to the updated application (step 2526). In an exemplary embodiment, the application registration table (see FIG. 7) in the gateway database 218 is searched for meta information associated with the updated application. Next, the gateway database 218 is accessed to load broadcast information, if any (step 2528). A success response is generated (step 2530) and an application update response is sent to the requesting mobile device 110 (step 2532). In an exemplary embodiment, the application update response includes at least one difference file, application meta information, and broadcast message, if any.

Figure 25A:
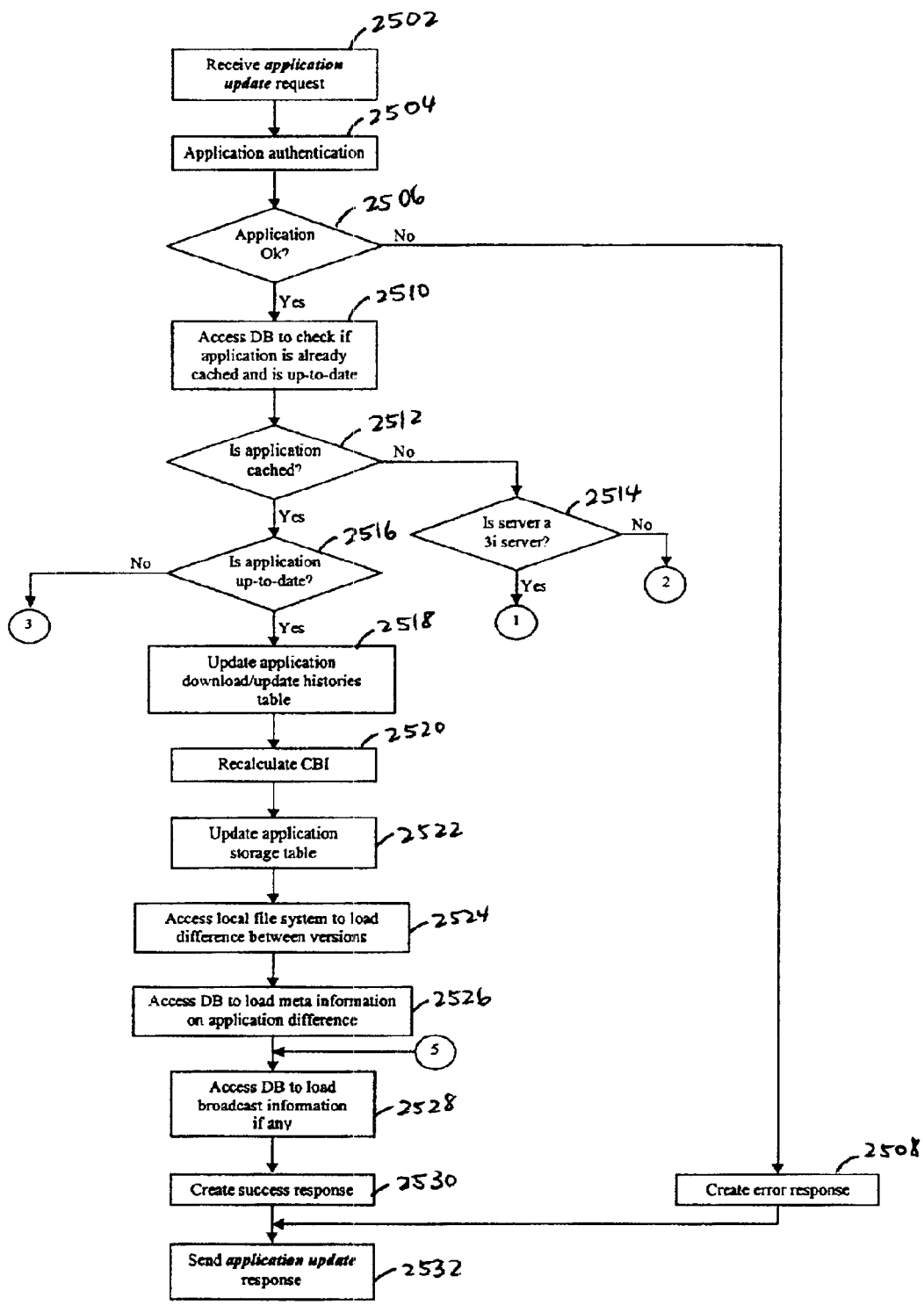
FIGS. 25A–D illustrate an exemplary application update process in accordance with an embodiment of the invention.
Figures 25B, 25C:
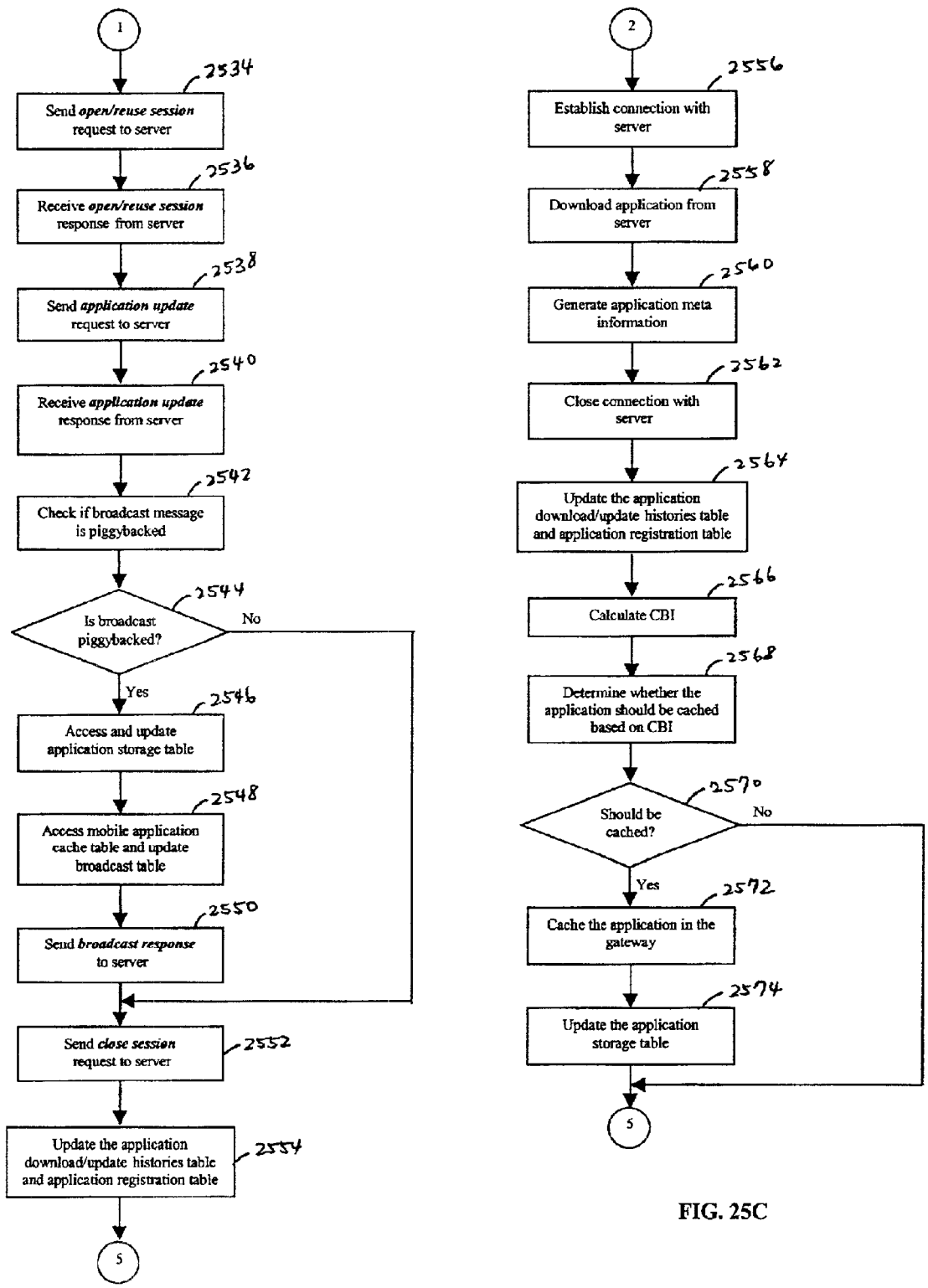

FIG. 25B illustrates an exemplary application update process when the server is a 3i server 104 in accordance with an embodiment of the invention. At step 2534, an open/reuse communication session request is sent to the 3i server 104. An open/reuse communication session response is received (step 2536). Next, an application update request is sent to the server 104 (step 2538) and an application update response is received from the server 104 (step 2540). In an exemplary embodiment, the response includes at least one difference file for updating the application. The response is parsed to determine whether a broadcast message is piggybacked (step 2542). If no broadcast message is piggybacked (step 2544), the process continues at step 2552. If a broadcast message is piggybacked (step 2544), the application storage table (see FIG. 13) is accessed and updated (step 2546). In an exemplary embodiment, a broadcast message includes an application URL and an application version for each of one or more applications. The application storage table is searched for the appVer and flagSet fields of each record that is associated with an application URL component in the broadcast message. The appVer of a matching record and an application version component in the broadcast message are compared. If the versions are different, then set a corresponding flagSet field to indicate that the associated application is out-of-date. The process repeats for all applications in the broadcast message. Next, the mobile application cache table (see FIG. 15) and the broadcast table (see FIG. 17) are accessed (step 2548). In an exemplary embodiment, the mobile application cache table is searched for the "subId" fields of all records that are associated with the application URLs in the broadcast message. For every identified subId field, a record comprising the subId, the application URL, and the application version are created and inserted into the broadcast table. Next, a broadcast response is sent back to the 3i server 104 (step 2550).

At step 2552, a close session request is sent to the server 104 and the communication is disconnected. The application download/update histories table (see FIG. 11) and the application registration table (see FIG. 7) are updated (step 2554) and the process continues at step 2528 in FIG. 25A. In an exemplary embodiment, a corresponding record in the application download/update histories table is updated as follows: the "appSize" field value is replaced with the application size of the updated application, the "nUpdate" field is incremented by 1, and the "timestamp" field value is replaced by the current time, and a new updateRate is calculated. In an exemplary embodiment, new updateRate is equal to (the old updateRate×old nUpdate+diffSize×100/appSize)/new nUpdate, where diffSize is the size difference between the new and old versions of the application. A corresponding record in the application registration table is updated as follows: the "appVer" field is replaced with the version of the updated application.

FIG. 25C illustrates an exemplary application update process when the server is a non-3i server 102 or 106 in accordance with an embodiment of the invention. At step 2556, a connection with the server 102 is established. Next, an application download request is sent, a response is received, and the application is downloaded from the server 102 (step 2558). Application meta information (e.g., application version, file versions, number of files, application size, etc.) associated with the downloaded application is generated (step 2560). The communication is disconnected (step 2562).

The application download/update histories table (see FIG. 11) and the application registration table (see FIG. 7) are updated (step 2564). In an exemplary embodiment, a corresponding record in the application download/update histories table is updated as follows: the "appSize" field value is replaced with the application size of the downloaded application, the "nDownload" field is incremented by 1, and the "timestamp" field value is replaced by the current time. A corresponding record in the application registration table is updated as follows: the "appVer" field is replaced with the version of the downloaded application. Next, a new CBI for the downloaded application is calculated (step 2566). In an exemplary embodiment, the new CBI is equal to the TDC. Whether the downloaded application should be cached is determined based on the calculated CBI (step 2568). If not, the process continues at step 2528 in FIG. 25A. If the downloaded application is to be cached (step 2570), the application is cached in the local file system 226 at the gateway 108 (step 2572). Next, the application storage table (see FIG. 13) is updated (step 2574) and the process continues at step 2528 in FIG. 25A. In an exemplary embodiment, a new record corresponding to the downloaded application is created and inserted into the application storage table. In an exemplary embodiment, the downloaded application is sent to the mobile device 110 in its entirety.

Figure 25D:
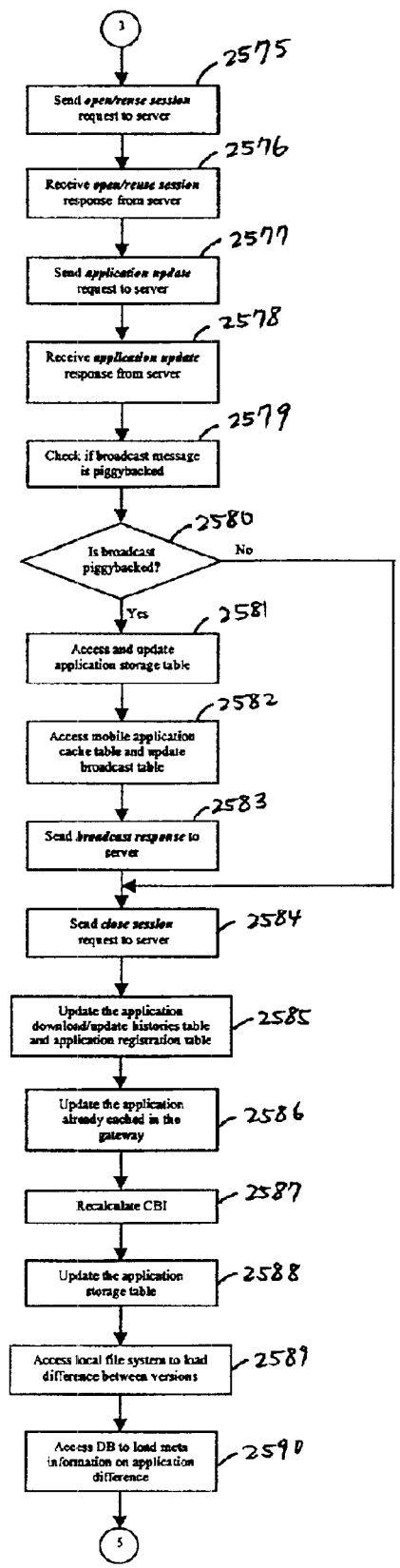

FIG. 25D illustrates another exemplary update process from a 3i server 104 in accordance with an embodiment of the invention. At step 2575, an open/reuse communication session request is sent to the 3i server 104. An open/reuse communication session response is received (step 2576). Next, an application update request is sent to the server 104 (step 2577) and an application update response is received from the server 106 (step 2578). In an exemplary embodiment, the response includes at least one difference file for updating the application differentially. The response is parsed to determine whether a broadcast message is piggybacked (step 2579). If no broadcast message is piggybacked (step 2580), the process continues at step 2584. If a broadcast message is piggybacked (step 2580), the application storage table (see FIG. 13) is accessed and updated (step 2581). In an exemplary embodiment, a broadcast message includes an application URL and an application version for each of one or more applications. The application storage table is searched for the appVer and flagSet fields of each record that is associated with an application URL component in the broadcast message. The appVer of a matching record and an application version component in the broadcast message are compared. If the versions are different, then set a corresponding flagSet field to indicate that the associated application is out-of-date. The process repeats for all applications in the broadcast message. Next, the mobile application cache table (see FIG. 15) and the broadcast table (see FIG. 17) are accessed (step 2582). In an exemplary embodiment, the mobile application cache table is searched for the "subId" fields of all records that are associated with the application URLs in the broadcast message. For every identified subId field, a record comprising the subId, the application URL, and the application version are created and inserted into the broadcast table. Next, a broadcast response is sent back to the server 104 (step 2583).

At step 2584, a close session request is sent to the server 104 and the communication is disconnected. The application download/update histories table (see FIG. 11) and the application registration table (see FIG. 7) are updated (step 2585). In an exemplary embodiment, a corresponding record in the application download/update histories table is updated as follows: the "appSize" field value is replaced with the application size of the updated application, the "nUpdate" field is incremented by 1, the "timestamp" field value is replaced by the current time, and the "updateRate" field value is recalculated. In an exemplary embodiment, new updateRate is equal to (the old updateRate×old nUpdate+diffSize×100/appSize)/new nUpdate, where diffSize is the size difference between the new and old versions of the application. A corresponding record in the application registration table is updated as follows: the "appVer" filed is replaced with the version of the downloaded application. Next, the application cached in the gateway 108 is updated based on the at least one difference file (step 2586) and differences between the updated application and an earlier version of the application are generated. A new CBI is calculated for the updated application (step 2587). In an exemplary embodiment, the new CBI is equal to the old CBI plus the size difference between the versions at the gateway 108 and at the mobile device minus the size difference between the updated version and the original version at the gateway. In another exemplary embodiment, the "updateRate" field is also updated. In one embodiment, the new update rate is equal to ((old updateRate$^{sg}$×old nUpdate$^{sg}$)+diffSize×100/new appSize)/new nUpdate$^{sg}$, where new appSize is the size of the updated application.

Next, the application storage table is updated (step 2588). In an exemplary embodiment, a record associated with the updated application in the application storage table is updated as follows: the "nFile," "fNames," "fVers," "nextRel," "lang," flagSet," "nUpdate," "updateRate," "CBI," and "updateItvl" fields are updated with new values. In an exemplary embodiment, a new updateItvl is equal to (1−UPDATE_TM_WEIGHT)×old updateItvl+UPDATE_TM_WEIGHT×(timestamp$_{now}$−lastUpdate), where UPDATE_TM_WEIGHT is as defined in Table 18, the lastUpdate is equal to the time of the last update, and the timestamp$_{now}$ is the current time. Next, the at least one difference file, which represents the difference between the updated version and the version cached at the mobile device 110, is loaded from the local file system 226 (step 2589), the associated meta information is loaded from the application storage table in the gateway database 218 (step 2590), and the process continues at step 2528 in FIG. 25A.

Figure 26A:
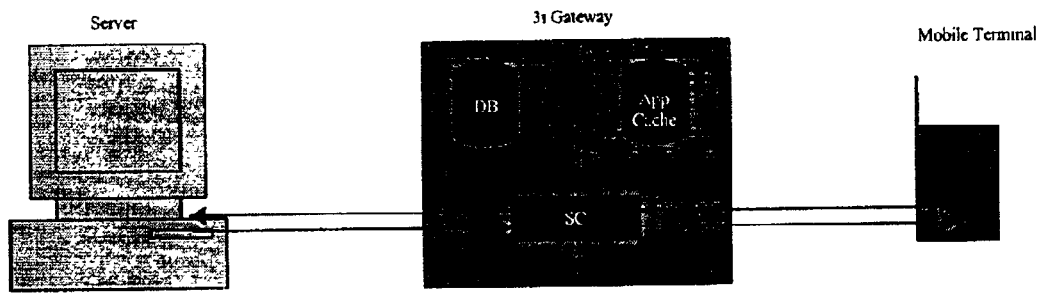
FIGS. 26A–C illustrate three modes of exemplary application status check processes in accordance with an embodiment of the invention.
Figure 26B:
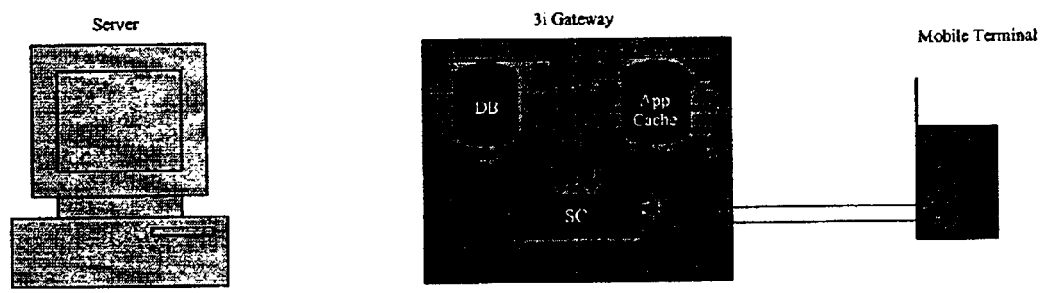
Figure 26C:
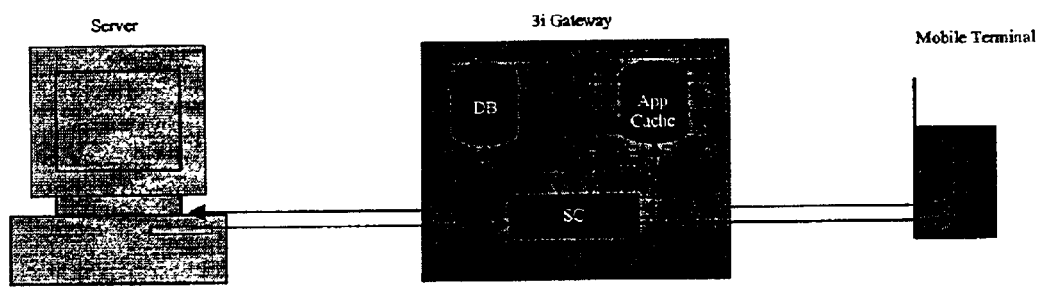

FIGS. 26A–26C schematically illustrate three modes of exemplary application/data status check processes in accordance with an embodiment of the invention. In FIG. 26A, the gateway 108 facilitates a direct application/data status check between a server 102–106 and the mobile device 110 without caching the application/data. In FIG. 26B, a requested application/data is already cached at the gateway 108 and the application/data is up-to-date; the gateway 108 directly checks the status of the application/data at the mobile device 110 without contacting the server 102–106. In FIG. 26C, a requested application/data is already cached at the gateway 108 and the cached version is out-of-date; the gateway 108 performs a status check on the cached application/data with the server 102–106 then performs a status check on the application/data at the mobile device 110.

FIGS. 27A–D illustrate an exemplary application status check process in accordance with an embodiment of the invention. At step 2702, an application status check request is received. The application requested is authenticated (step 2704). In an exemplary embodiment, an application URL is identified from the application update request. The application identification table (see FIG. 4) and the application registration table (see FIG. 7) in the gateway database 218 are searched using the application URL. If a matching record exists and the associated application is not disabled (e.g., the flagSet field is in the application registration table "off"), then the application is authenticated. If the application is not authenticated, an error response is created (step 2708) and sent to the requesting mobile device 110. If the application is authenticated (step 2706), then whether the application is already cached is checked (step 2710). If the application is not cached (step 2712), whether a server, where the application can be downloaded, is a 3i server is determined (step 2714). If the server is a 3i server, the process continues in FIG. 27B. Otherwise, the process continues in FIG. 27C.

Referring back to step 2712, if the application is already cached, whether the application is up-to-date (or more current than the version cached at the mobile device 110) is determined (step 2716). If the application is not up-to-date (and/or is the same version as the version cached at the mobile device 110), the process continues in FIG. 27D. If the application is up-to-date, the gateway database 218 is accessed to load broadcast information, if any (step 2718). A success response is generated (step 2720) and an application status check response is sent to the requesting mobile device 110 (step 2722). In an exemplary embodiment, the application status check response is generated by comparing the application version indicated in the status check request and the application version in the application registration table (see FIG. 7) at the gateway database 218 or downloaded/generated from the server response.

Figure 27A:
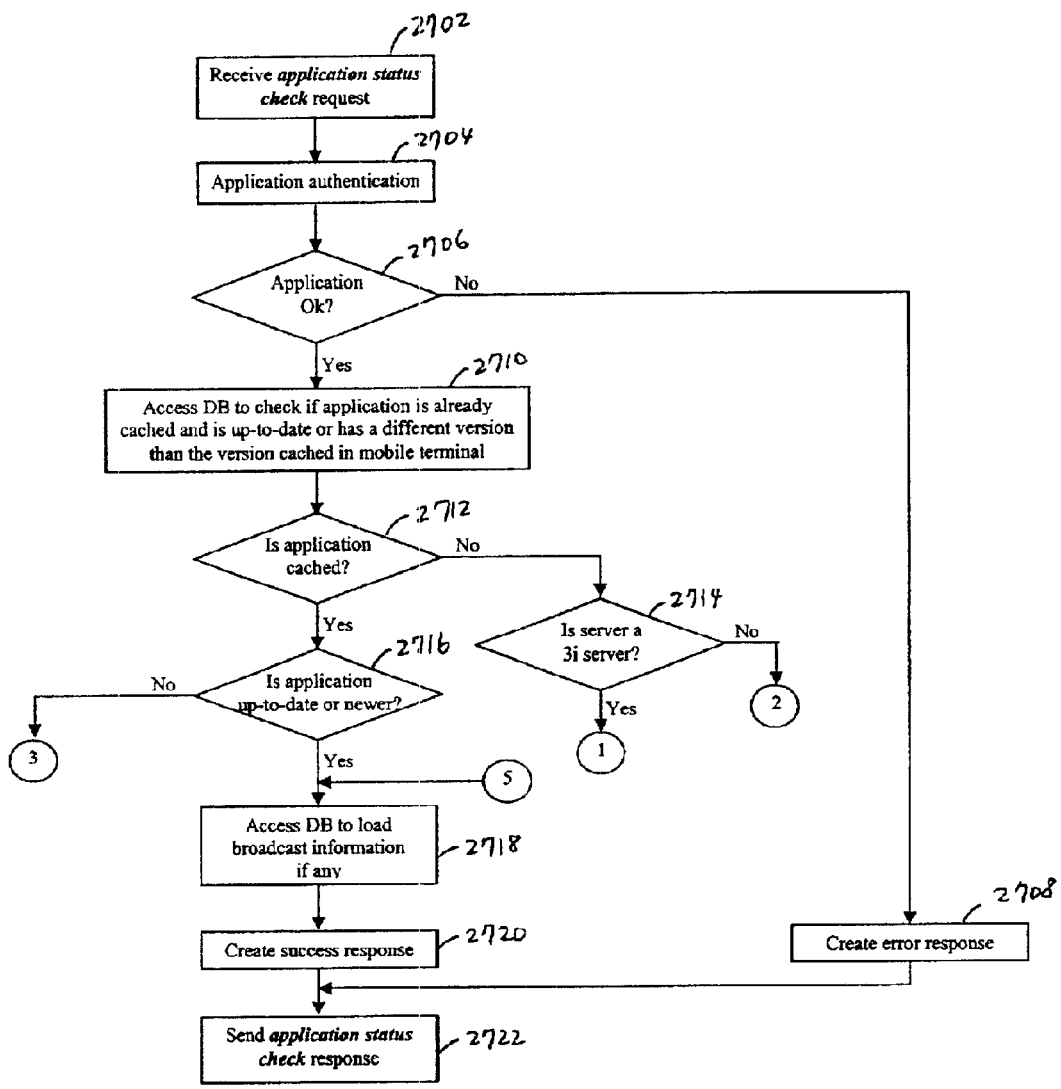
FIGS. 27A–D illustrate an exemplary application status check process in accordance with an embodiment of the invention.
Figures 27B, 27C:
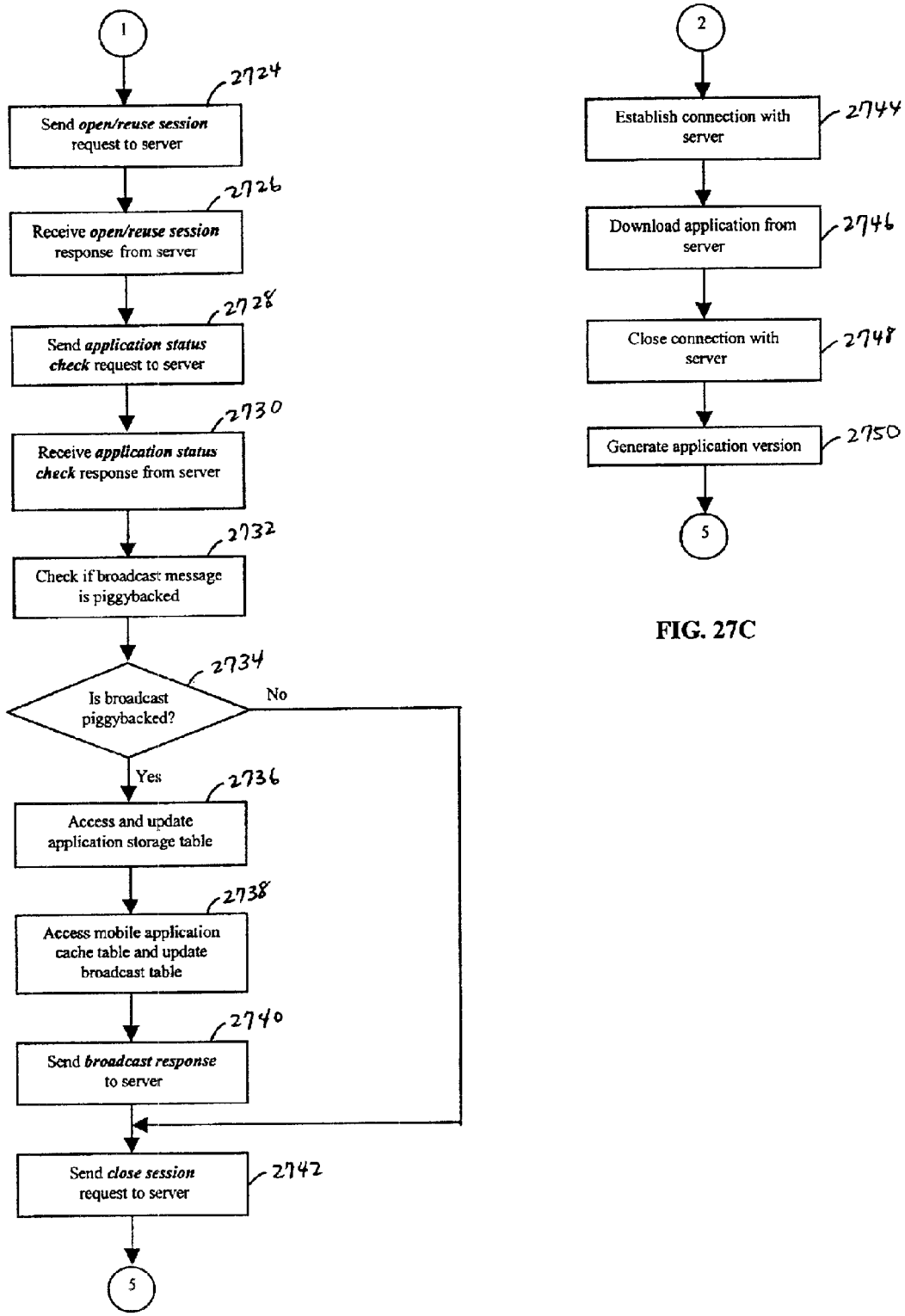

FIG. 27B illustrates an exemplary status check process when the server is a 3i server 104 in accordance with an embodiment of the invention. At step 2724, an open/reuse communication session request is sent to the 3i server 104. An open/reuse communication session response is received (step 2726). Next, an application status check request is sent to the server 104 (step 2728) and an application status check response is received from the server 106 (step 2730). In an exemplary embodiment, the response includes the current version and status of the application. The response is parsed to determine whether a broadcast message is piggybacked (step 2732). If no broadcast message is piggybacked (step 2734), the process continues at step 2742. If a broadcast message is piggybacked (step 2734), the application storage table (see FIG. 13) is accessed and updated (step 2736). In an exemplary embodiment, a broadcast message includes an application URL and an application version for each of one or more applications. The application storage table is searched for the appVer and flagSet fields of each record that is associated with an application URL component in the broadcast message. The appVer of a matching record and an application version component in the broadcast message are compared. If the versions are different, then set a corresponding flagSet field to indicate that the associated application is out-of-date. This process repeats for all applications in the broadcast message. Next, the mobile application cache table (see FIG. 15) and the broadcast table (see FIG. 17) are accessed (step 2738). In an exemplary embodiment, the mobile application cache table is searched for the "subId" fields of all records that are associated with the application URLs in the broadcast message. For every identified subId field, a record comprising the subId, the application URL, and the application version are created and inserted into the broadcast table. Next, a broadcast response is sent back to the 3i server 104 (step 2740). At step 2742, a close session request is sent to the server 104 and the communication is disconnected and the process continues at step 2718 in FIG. 27A.

FIG. 27C illustrates an exemplary status check process when the server is a non-3i server 102 or 106 in accordance with an embodiment of the invention. At step 2744, a connection with the server 102 is established. Next, an application download request is sent, a response is received, and an application is downloaded from the server 102 (step 2746). The communication is disconnected (step 2748). The application version is generated from the downloaded application by calling the version calculator 230 (see FIG. 2) (step 2750) and the process continues at step 2718 in FIG. 27A. In an exemplary embodiment, the version calculator 230 compares the downloaded application and the application already cached at the gateway 108 or at the mobile device 110.

Figure 27D:
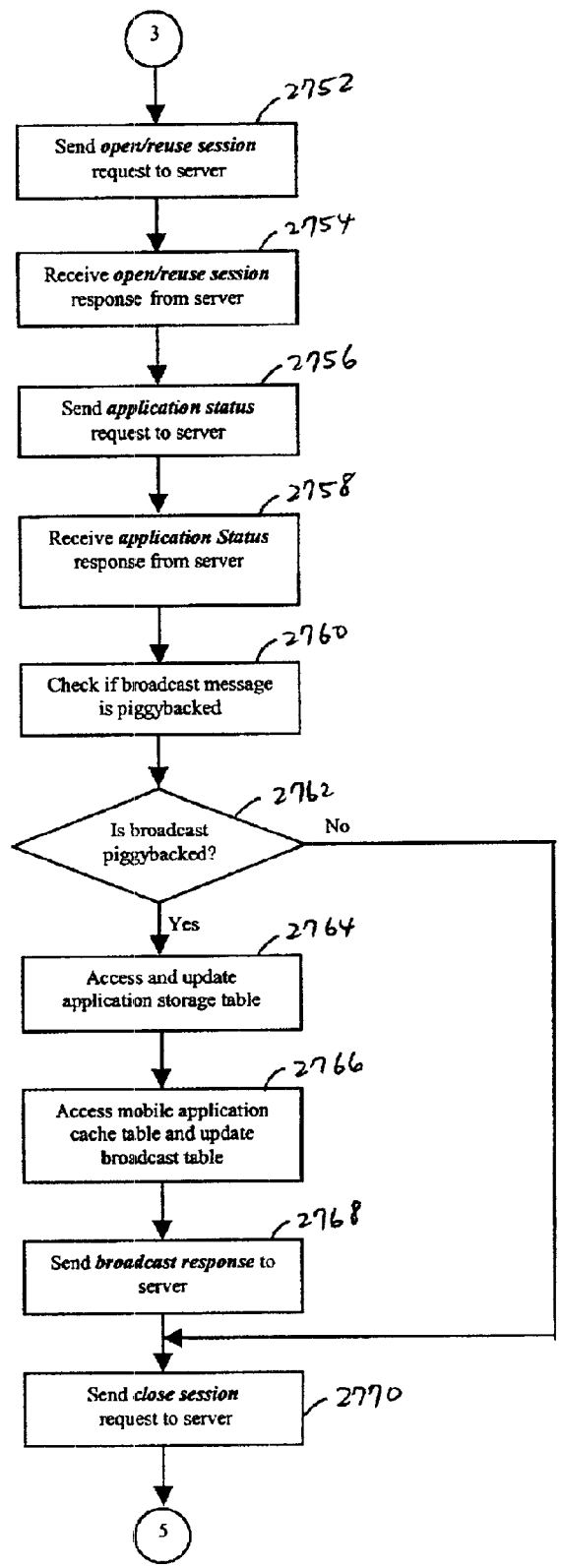

FIG. 27D illustrates another exemplary status check process when the server is a 3i server 104 in accordance with an embodiment of the invention. At step 2752, an open/reuse communication session request is sent to the 3i server 104. An open/reuse communication session response is received (step 2754). Next, an application status check request is sent to the server 104 (step 2756) and an application status check response is received from the server 104 (step 2758). In an exemplary embodiment, the response includes the current version and status of the application. The response is parsed to determine whether a broadcast message is piggybacked (step 2760). If no broadcast message is piggybacked (step 2762), the process continues at step 2770. If a broadcast message is piggybacked (step 2762), the application storage table (see FIG. 13) is accessed and updated (step 2764). In an exemplary embodiment, a broadcast message includes an application URL and an application version for each of one or more applications. The application storage table is searched for the appVer and flagSet fields of each record that is associated with an application URL component in the broadcast message. The appVer of a matching record and an application version component in the broadcast message are compared. If the versions are different, then set a corresponding flagSet field to indicate that the associated application is out-of-date. This process repeats for all applications in the broadcast message. Next, the mobile application cache table (see FIG. 15) and the broadcast table (see FIG. 17) are accessed (step 2766). In an exemplary embodiment, the mobile application cache table is searched for the "subId" fields of all records that are associated with the application URLs in the broadcast message. For every identified subId field, a record comprising the subId, the application URL, and the application version are created and inserted into the broadcast table. Next, a broadcast response is sent back to the 3i server 104 (step 2768). At step 2770, a close session request is sent to the server 104 and the communication is disconnected and the process continues at step 2718 in FIG. 27A.

In an exemplary embodiment, application and file versions are calculated by applying a one-way hashing function (e.g., MD4). To calculate an application version, all files belonging to an application are organized in a defined order then a one-way hashing function is applied to the files. This method assumes that servers generally download contents of an application in a consistent order. To calculate a file version, contents of a file is organized in a byte stream then a one-way hashing function is applied to the byte stream. Generally, the same one-way hashing function is used for calculating both application and file versions.

Although FIGS. 21–27 illustrate exemplary processes to process applications, a person skilled in the art would recognize that these processes similarly apply to process data.

An application or data typically comprises a set of files. When an application or data is updated, one or more of a corresponding set of files is updated (i.e., added, modified, or removed). In an exemplary embodiment, one or more difference files are created by the gateway 108 or the 3i server 104 that represents the difference between the old version and the new version of the application to be updated. A difference file provides information regarding a file to be added to an original set of files, a file in an original set of files that should be modified, or a file in an original set of files that should be deleted. For example, for adding a file, a difference file includes the file's name, a 16-byte version information, contents of the new file, and the size of the new file in bytes. For deleting a file, a difference file includes the name of the file to be deleted. For modifying a file, a difference file includes a description of the difference between the modified file and the original file or the contents of the modified file, whichever is smaller.

Figure 28:
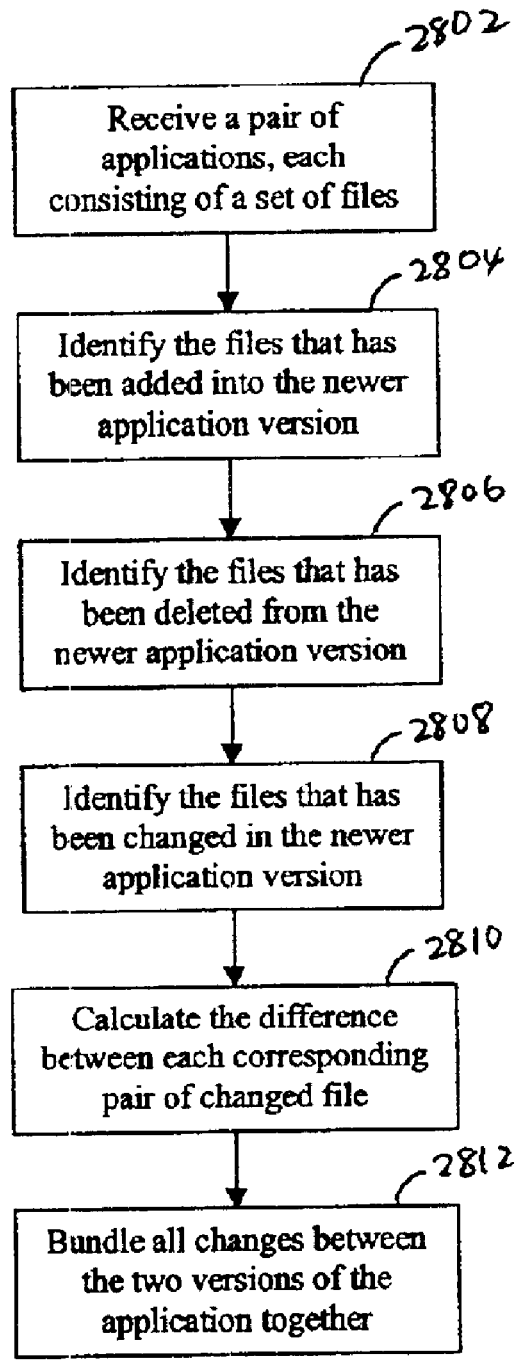
FIG. 28 illustrates an exemplary process for identifying differences between two application/data versions in accordance with an embodiment of the invention.

FIG. 28 illustrates an exemplary process to identify the difference between an old application and a new application in accordance with an embodiment of the invention. At step 2802, an old application and a new application are received. Each application comprises a set of files. Next, the files that were added into the new application are identified (step 2804). The files that were deleted from the new application are identified (step 2806). The files that were modified in the new application are identified (step 2808). The difference between each corresponding pair of changed files is calculated (step 2810). All calculated changes are bundled together (step 2812).

Figure 29:
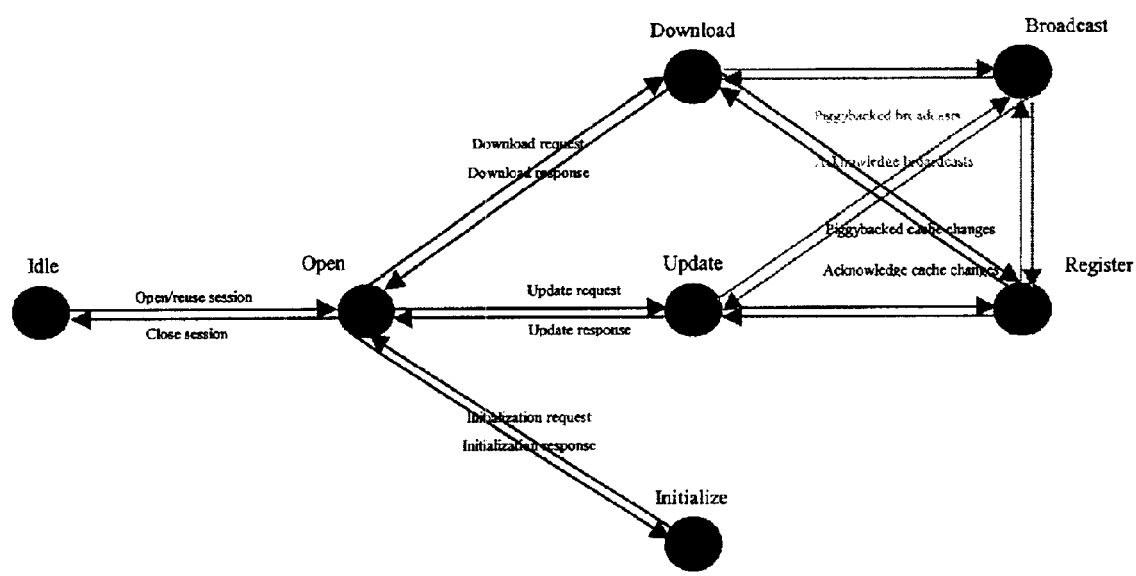
FIG. 29 schematically illustrates exemplary smart connectivity protocol state machines in accordance with an embodiment of the invention

The smart connectivity protocol (SCP) is a protocol used for application/data management between the mobile device 110 and the gateway 108 or between the mobile device 110 and a remote server 102. FIG. 29 illustrates exemplary state machines of the SCP in accordance with an embodiment of the invention. Generally, when the SCP is in an Idle state, no communication session is created and, thus, no communication activity is taking place. When the SCP is in an Open state, a communication session is created; the system may be for communication requests from a client. When the SCP is in a Download state, a download request is sent or a download response is prepared. When the SCP is in an Update state, an update request is sent or an update response is prepared. When the SCP is in an Initialize state, an initialization request is sent or an initialization is prepared. When the SCP is in a Register state, cache changes are piggybacked or an acknowledgment is prepared. When the SCP is in a Broadcast state, broadcasts are piggybacked or an acknowledgment is prepared.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A computer implemented method for intelligently caching applications and data on a gateway, comprising the steps of:

calculating a cache benefit index for a set of files, said cache benefit index;
being calculated based at least on the frequency of updates of said set of files at said gateway, and indicating a total benefit for caching said set of files;

determining whether to cache said set of files on a local file system based on said cache benefit index, wherein said determining includes the steps of: comparing said cache benefit index to previously calculated cache benefit index for said set of files, and allowing caching of said set of files if said cache benefit index is higher than said previously calculated cache index;

caching said set of files on said local file system; and updating a set of tables in a gateway database based on said caching.

2. The method of claim 1, wherein said determining includes the steps of:
   checking available free space in said local file system; and
   allowing caching of said set of files into said local file system if said local file system has enough available free space for storing said set of files.

3. The method of claim 1, wherein said determining includes the steps of:
   comparing said cache benefit index to other cache benefit indices of files already cached on said local file system; and
   allowing caching of said set of files if said cache benefit index is higher than said other cache benefit indices.

4. The method of claim 1, further comprising the steps of:
   recalculating a new cache benefit index for said set of files upon receiving a request to download or update said set of files; and
   updating said set of tables in said gateway database based on said new cache benefit index.

5. The method of claim 1, further comprising the steps of:
   receiving a download request for said set of files;
   accessing said set of files in said local file system if said set of files is cached and up-to-date;
   creating a download response to said download request, said download response including said set of files; and
   sending said download response.

6. The method of claim 5, further comprising the step of:
   downloading said set of files from a server if it is not cached.

7. The method of claim 6, wherein said downloading includes the steps of:
   sending a request to said server;
   receiving a response from said server, said response including said set of files;
   parsing said response for a broadcast message;
   accessing and updating said gateway database if said response includes said broadcast message; and
   sending a broadcast response to said server.

8. The method of claim 5, further comprising the step of:
   updating said set of files from a server if it is not up-to-date.

9. The method of claim 1, further comprising the steps of:
   receiving an update request for said set of files;
   accessing said local file system to obtain at least one difference file and a broadcast message if said set of files is cached and up-to-date;
   creating an update response to said update request, said update response including said at least one difference file and said broadcast message; and
   sending said update response.

10. The method of claim 1, further comprising the steps of:
    receiving an update request for said set of files;
    downloading said set of files from a server if said set of files is not cached;
    creating an update response to said update request, said update response including said downloaded set of files; and
    sending said update response.

11. The method of claim 1, further comprising the steps of:
    receiving an update request for said set of files;
    receiving at least one difference file from a server if said set of files is cached but is not up-to-date;
    creating an update response to said update request, said update response including said at least one difference file; and
    sending said update response.

12. The method of claim 1, further comprising the steps of:
    receiving an update request for said set of files;
    downloading a current version of said set of files from a server if said set of files is cached but is not up-to-date;
    generating at least one difference file based on said current version;
    creating an update response to said update request, said update response including said at least one difference file; and
    sending said update response.

13. The method of claim 1, further comprising the steps of:
    receiving a status check request for said set of files;
    accessing said local file system to load any broadcast information if said set of files is up-to-date;
    creating a status check response, said status check response including said broadcast information and a status of said set of files; and
    sending said status check response.

14. The method of claim 1, further comprising the steps of:
    receiving a status check request for said set of files;
    sending a request to a server if said set of files is cached and is not up-to-date;
    receiving a server response from said server, said server response including a current version and status of said set of files;
    updating said gateway database based on said current version and status;
    creating a status check response, said status check response including said status of said set of files; and
    sending said status check response.

15. The method of claim 14, further comprising the steps of:
    generating at least one difference file based on said current version;
    updating said set of files based on said difference file; and
    sending said difference file in said status check response.

16. The method of claim 14, further comprising the steps of:
    parsing said server response for any broadcast message;
    accessing and updating said gateway database if said server response includes a broadcast message; and
    sending a broadcast response to said server.

17. The method of claim 1, further comprising the steps of:
    receiving a status check request for said set of files;
    downloading a current version of said set of files from a server;
    comparing said current version of said set of files to said set of files;
    generating said status based on said comparing;
    creating a status check response, said status check response including said status of said set of files; and
    sending said status check response.

18. A computer program product for use in conjunction with a computer system for intelligently caching applications and data on a gateway, comprising:
    logic code for calculating a cache benefit index for a set of files, said cache benefit index;
      being calculated based at least on the frequency of updates of said set of files at said gateway, and
      indicating a total benefit for caching said set of files;
    logic code for determining whether to cache said set of files on a local file system based on said cache benefit index, wherein said logic code for determining includes: logic code for comparing said cache benefit index to a previously calculated cache benefit index for said set of flies, and logic code for allowing caching of said set of files if said cache benefit index is higher than said previously calculated cache benefit index;

logic code for caching said set of files on said local file system; and logic code for updating a set of tables in a gateway database based on said caching.

19. The computer program product of claim 18, wherein said logic code for determining includes:

logic code for checking available free space in said local file system; and logic code for allowing caching of said set of files into said local file system if said local file system has enough available free space for storing said set of files.

20. The computer program product of claim 18, wherein said logic code for determining includes:

logic code for comparing said cache benefit index to other cache benefit indices of files already cached on said local file system; and logic code for allowing caching of said set of files if said cache benefit index is higher than said other cache benefit indices.

21. The computer program product of claim 18, further comprising:

logic code for recalculating a new cache benefit index for said set of files upon receiving a request to download or update said set of files; and logic code for updating said set of tables in said gateway database based on said new cache benefit index.

22. The computer program product of claim 18, further comprising:

logic code for receiving a download request for said set of files;

logic code for accessing said set of files in said local file system if said set of files is cached and up-to-date;

logic code for creating a download response to said download request, said download response including said set of files; and logic code for sending said download response.

23. The computer program product of claim 22, further comprising:

logic code for downloading said set of files from a server if it is not cached.

24. The computer program product of claim 23, wherein said logic code for downloading includes:

logic code for sending a request to said server;

logic code for receiving a response from said server, said response including said set of files;

logic code for parsing said response for a broadcast message;

logic code for accessing and updating said gateway database if said response includes said broadcast message; and logic code for sending a broadcast response to said server.

25. The computer program product of claim 22, further comprising:

logic code for updating said set of files from a server if it is not up-to-date.

26. The computer program product of claim 18, further comprising:

logic code for receiving an update request for said set of files;

logic code for accessing said local file system to obtain at least one difference file and a broadcast message if said set of files is cached and up-to-date;

logic code for creating an update response to said update request, said update response including said at least one difference file and said broadcast message; and logic code for sending said update response.

27. The computer program product of claim 18, further comprising:

logic code for receiving an update request for said set of files;

logic code for downloading said set of files from a server if said set of files is not cached;

logic code for creating an update response to said update request, said update response including said downloaded set of files; and logic code for sending said update response.

28. The computer program product of claim 18, further comprising:

logic code for receiving an update request for said set of files;

logic code for receiving at least one difference file from a server if said set of files is cached but is not up-to-date;

logic code for creating an update response to said update request, said update response including said at least one difference file; and logic code for sending said update response.

29. The computer program product of claim 18, further comprising:

logic code for receiving an update request for said set of files;

logic code for downloading a current version of said set of files from a server if said set of files is cached but is not up-to-date;

logic code for generating at least one difference file based on said current version;

logic code for creating an update response to said update request, said update response including said at least one difference file; and logic code for sending said update response.

30. The computer program product of claim 18, further comprising:

logic code for receiving a status check request for said set of files;

logic code for accessing said local file system to load any broadcast information if said set of files is up-to-date;

logic code for creating a status check response, said status check response including said broadcast information and a status of said set of files; and logic code for sending said status check response.

31. The computer program product of claim 18, further comprising:

logic code for receiving a status check request for said set of files;

logic code for sending a request to a server if said set of files is cached and is not up-to-date;

logic code for receiving a server response from said server, said server response including a current version and status of said set of files;

logic code for updating said gateway database based on said current version and status;

logic code for creating a status check response, said status check response including said status of said set of files; and logic code for sending said status check response.

32. The computer program product of claim 31, further comprising:

logic code for generating at least one difference file based on said current version;

logic code for updating said set of files based on said difference file; and logic code for sending said difference file in said status check response.

33. The computer program product of claim 31, further comprising:

logic code for parsing said server response for any broadcast message;

logic code for accessing and updating said gateway database if said server response includes a broadcast message; and logic code for sending a broadcast response to said server.

34. The computer program product of claim 18, further comprising:

logic code for receiving a status check request for said set of files;

logic code for downloading a current version of said set of files from a server;

logic code for comparing said current version of said set of files to said set of files;

logic code for generating said status based on said comparing;

logic code for creating a status check response, said status check response including said status of said set of files; and logic code for sending said status check response.

* * * * *